United States Patent
Kawakami et al.

(10) Patent No.: US 7,615,314 B2
(45) Date of Patent: Nov. 10, 2009

(54) ELECTRODE STRUCTURE FOR LITHIUM SECONDARY BATTERY AND SECONDARY BATTERY HAVING SUCH ELECTRODE STRUCTURE

(75) Inventors: Soichiro Kawakami, Sagamihara (JP); Akira Morita, Ohta-ku (JP); Takao Ogura, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 463 days.

(21) Appl. No.: 11/296,460

(22) Filed: Dec. 8, 2005

(65) Prior Publication Data

US 2006/0127773 A1    Jun. 15, 2006

(30) Foreign Application Priority Data

Dec. 10, 2004    (JP)    ............................. 2004-358458

(51) Int. Cl.
  *H01M 4/58*    (2006.01)
  *H01M 4/62*    (2006.01)

(52) U.S. Cl. .................. 429/231.8; 429/217; 429/231.1; 429/232

(58) Field of Classification Search .............. 429/218.1, 429/245, 232, 217, 231.8, 231.1; 29/2, 523.5
See application file for complete search history.

(56) References Cited

U.S. PATENT DOCUMENTS

| | | | |
|---|---|---|---|
| 5,491,037 A | 2/1996 | Kawakami | 429/49 |
| 5,641,591 A | 6/1997 | Kawakami et al. | 429/218 |
| 5,658,689 A | 8/1997 | Kawakami et al. | 429/194 |
| 5,698,339 A | 12/1997 | Kawakami et al. | 429/212 |
| 5,702,845 A | 12/1997 | Kawakami et al. | 429/224 |
| 5,728,482 A | 3/1998 | Kawakami et al. | 429/10 |
| 5,795,679 A | 8/1998 | Kawakami et al. | 429/218 |
| 5,800,939 A | 9/1998 | Mishina et al. | 429/57 |
| 5,824,434 A | 10/1998 | Kawakami et al. | 429/209 |
| 5,882,811 A | 3/1999 | Kawakami | 429/49 |
| 5,888,666 A | 3/1999 | Kawakami | 429/62 |
| 5,919,589 A | 7/1999 | Kawakami et al. | 429/231.8 |
| 5,998,063 A | 12/1999 | Kobayashi et al. | 429/218.1 |
| 6,051,340 A | 4/2000 | Kawakami et al. | 429/231.95 |

(Continued)

FOREIGN PATENT DOCUMENTS

JP    11-283627    10/1999

(Continued)

*Primary Examiner*—Patrick Ryan
*Assistant Examiner*—Thomas H. Parsons
(74) *Attorney, Agent, or Firm*—Fitzpatrick, Cella, Harper & Scinto

(57) ABSTRACT

An electrode structure for a lithium secondary battery including: a main active material layer including a metal powder selected from silicon, tin and an alloy thereof that can store and discharge lithium by electrochemical reaction, and a binder of an organic polymer; and a current collector. The main active material layer includes a powder of a support material for supporting the electron conduction of the main active material layer in addition to the metal powder and the powder of the support material are particles having a spherical, pseudo-spherical or pillar shape with an average particle size of 0.3 to 1.35 times the thickness of the main active material layer. The support material is one or more selected from graphite, oxides of transition metals and metals that do not electrochemically form alloy with lithium. Organic polymer compounded with a conductive polymer is used for the binder.

7 Claims, 7 Drawing Sheets

U.S. PATENT DOCUMENTS

| | | |
|---|---|---|
| 6,063,142 A | 5/2000 | Kawakami et al. .......... 29/623.5 |
| 6,165,642 A | 12/2000 | Kawakami et al. ....... 429/218.1 |
| 6,171,727 B1 | 1/2001 | Ogura et al. ............. 429/218.2 |
| 6,329,096 B2 | 12/2001 | Kawakami et al. ............ 429/49 |
| 6,372,387 B1 | 4/2002 | Kawakami et al. .......... 429/303 |
| 6,377,030 B1 | 4/2002 | Asao et al. ................. 320/161 |
| 6,383,686 B1 | 5/2002 | Umeno et al. ............ 429/231.8 |
| 6,432,585 B1 | 8/2002 | Kawakami et al. .......... 429/233 |
| 6,475,664 B1 | 11/2002 | Kawakami et al. .......... 429/137 |
| 6,517,974 B1 | 2/2003 | Kobayashi et al. ..... 429/231.95 |
| 6,558,847 B1 | 5/2003 | Kawakami et al. ..... 429/231.95 |
| 6,558,848 B1 | 5/2003 | Kobayashi et al. .......... 429/241 |
| 6,569,568 B2 | 5/2003 | Kobayashi et al. .......... 429/221 |
| 6,589,696 B2 * | 7/2003 | Matsubara et al. ........ 429/231.8 |
| 6,596,432 B2 | 7/2003 | Kawakami et al. ............ 429/60 |
| 6,638,322 B1 | 10/2003 | Kawakami et al. ......... 29/623.1 |
| 6,649,304 B2 | 11/2003 | Tani et al. ................... 429/223 |
| 6,730,434 B1 | 5/2004 | Kawakami et al. ....... 429/218.1 |
| 6,733,922 B2 * | 5/2004 | Matsubara et al. ....... 429/231.8 |
| 6,835,332 B2 | 12/2004 | Yamamoto et al. ....... 252/519.1 |
| 6,902,845 B2 | 6/2005 | Tani et al. ................ 429/218.2 |
| 6,924,059 B1 | 8/2005 | Kawakami et al. .......... 429/162 |
| 6,932,955 B2 | 8/2005 | Yamamoto et al. .......... 423/518 |
| 6,949,312 B1 | 9/2005 | Kawakami et al. ....... 429/218.1 |
| 7,060,117 B2 | 6/2006 | Ogura et al. ................ 29/623.2 |
| 7,141,187 B2 | 11/2006 | Kosuzu et al. ............ 252/521.3 |
| 7,183,018 B2 | 2/2007 | Kawakami et al. ....... 429/218.1 |
| 7,190,171 B2 | 3/2007 | Kawakami et al. .......... 324/430 |
| 7,399,552 B2 * | 7/2008 | Kano et al. ............... 429/231.4 |
| 2003/0211396 A1 | 11/2003 | Kobayashi et al. ..... 429/231.95 |
| 2004/0175618 A1 | 9/2004 | Inoue et al. .............. 429/231.1 |
| 2004/0191630 A1 | 9/2004 | Kawamura et al. ..... 429/231.95 |
| 2005/0003273 A1 | 1/2005 | Hagiwara et al. ...... 429/231.95 |
| 2005/0019668 A1 | 1/2005 | Yamamoto et al. .......... 429/317 |
| 2006/0006837 A1 | 1/2006 | Ogura et al. ................. 320/112 |
| 2006/0040182 A1 | 2/2006 | Kawakami et al. ....... 429/218.1 |
| 2006/0237697 A1 | 10/2006 | Kosuzu et al. ............... 252/500 |
| 2007/0031730 A1 | 2/2007 | Kawakami et al. ....... 429/218.1 |

FOREIGN PATENT DOCUMENTS

| | | |
|---|---|---|
| JP | 2000-215887 | 8/2000 |
| JP | 2000-311681 | 11/2000 |
| WO | 00/17949 | 3/2000 |

* cited by examiner

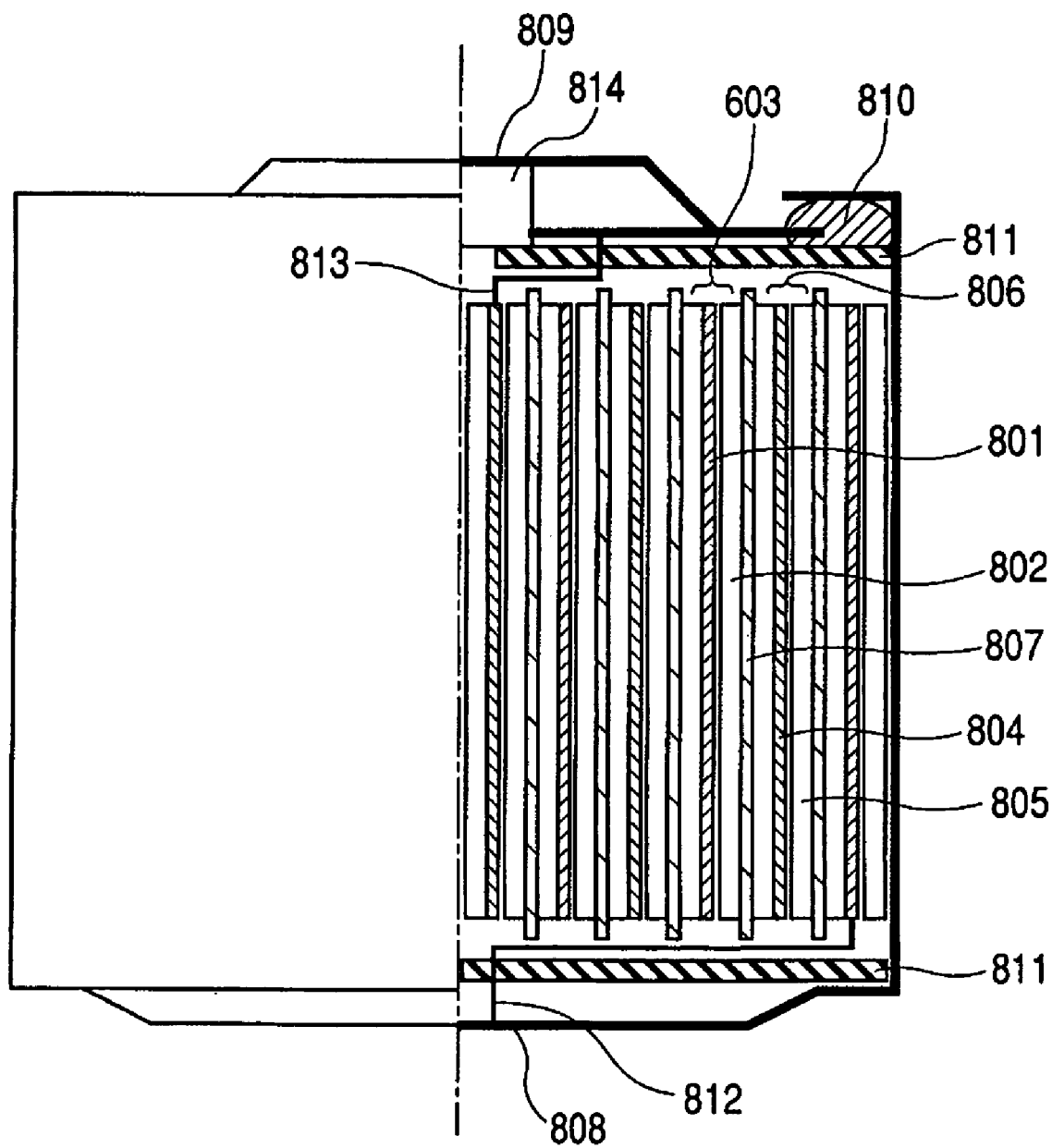

ELECTRODE STRUCTURE FOR LITHIUM SECONDARY BATTERY AND SECONDARY BATTERY HAVING SUCH ELECTRODE STRUCTURE

BACKGROUND OF THE INVENTION

1. Field of the Invention

This invention relates to an electrode material for a lithium secondary battery (lithium rechargeable battery), which is formed from the powder of particles containing a metal such as silicon or tin that forms an alloy with lithium by electrochemical reaction, to an electrode structure including such an electrode material and also to a secondary battery having such an electrode structure.

2. Related Background Art

The fear for warming the surface of the earth due to the so-called hothouse effect because of the increasing ratio of $CO_2$ gas contained in the atmosphere has been pointed out in recent years. Thermoelectric power plants convert the thermal energy obtained by burning fossil fuel into electric energy but it has been made difficult to build new thermoelectric power plants because they give off $CO_2$ gas by a large quantity. To get rid of this problem, leveling the load of thermoelectric power plants, so-called load leveling, by storing the surplus electric power that is produced during the night in secondary batteries installed in ordinary houses for the daytime when electric power is consumed at an enormous rate has been proposed in order to effectively use the electric power generated by the generators of power plants including thermoelectric power plants.

Besides, development of secondary batteries with a high energy density is expected for electric automobile applications that are characterized by not emitting substances that contaminate the atmosphere such as $CO_2$, $NO_x$ and hydrocarbons. Additionally, development of small, lightweight and high performance secondary batteries is an urgent issue for power source applications in the field of portable appliances such as notebook-sized personal computers, video cameras, digital cameras, cellular phones and PDAs (personal digital assistants).

So-called rocking chair type "lithium ion batteries" have been developed and made commercially available for family use as compact, lightweight and high performance secondary batteries. A rocking chair type lithium ion battery is prepared by using a lithium intercalation compound that de-intercalates lithium ions by a reaction that takes place at the time of charging as a positive electrode material and a carbon material, which is typically graphite that can intercalate lithium between two layers of the planes of the carbon hexagons formed by carbon atoms as a negative electrode material.

However, the above "lithium ion battery" cannot realize a secondary battery with a high energy density that is comparable to a lithium primary battery using metal lithium as a negative electrode material because maximally only 1/6 of a lithium atom per carbon atom can be theoretically intercalated into the negative electrode formed from a carbon material. If lithium is tried to be intercalated at a rate higher than the theoretically possible rate into the carbon-made negative electrode of the "lithium ion battery" at the time of charging or if the "lithium ion battery" is tried to be charged with electricity in a high electric current density condition, metal lithium grows on the surface of the carbon-made negative electrode as dendrite (showing a form of ramification) to eventually end up with internal short-circuiting between the negative electrode and the positive electrode as a result of repetition of a charging/discharging cycle. Thus, "lithium ion batteries" having a satisfactory cycle life have not been provided if the graphite electrode is made to show a capacity that exceeds the theoretically possible capacity level.

Meanwhile, high capacity lithium secondary batteries having a negative electrode made of metal lithium have been attracting attention as secondary batteries showing a high energy density but have not achieved any commercial success yet because the cycle life of such batteries is short. The reasons for such a very short cycle life are believed to include that metal lithium reacts with impurities such as moisture in the electrolyte solution and the organic solvent to form an insulating film and that the surface of the metal lithium foil is not plane but has spots where an intense electric field is found to grow dendrite of metal lithium that by turn give rise to internal short-circuiting between the negative electrode and the positive electrode.

There have been proposed techniques to use an alloy of lithium and aluminum for the negative electrode in order to suppress the progress of the reaction between metal lithium and moisture in the electrolyte solution and the organic solvent, which is one of the problems of secondary batteries having a negative electrode made of metal lithium. However, the lithium alloy is very hard and cannot be wound in a spiral form and hence it is not possible to prepare spiral type cylindrical batteries. Additionally, the cycle life is not extended as expected and the energy density comparable to a battery having a negative electrode of metal lithium has not been achieved. Thus, such techniques have not been commercially successful so far for these reasons.

In order to solve the above-described problems, the inventors of the present invention have proposed negative electrodes made of silicon, tin and the like for lithium secondary batteries in U.S. Pat. Nos. 6,051,340, 5,795,679 and 6,432,585 and Japanese Patent Application Laid-Open Publication Nos. H11-283627, 2000-311681 and International Publication No. WO00/17949. More specifically, U.S. Pat. No. 6,051,340 proposes a lithium secondary battery that uses a negative electrode where an electrode layer is formed by using metals of silicon and tin that form an alloy with lithium and metals of nickel and copper that do not form any alloy with lithium on a current collector of a metal material that does not form any alloy with lithium either. U.S. Pat. No. 5,795,679 proposes a lithium secondary battery that uses a negative electrode formed from a powdery alloy of elements such as nickel or copper and elements such as tin. U.S. Pat. No. 6,432,585 proposes a lithium secondary alloy that uses a negative electrode of which the electrode material layer contains particles of silicon and tin having an average particle diameter of 0.5 to 60 µm at an amount of 35 wt % or more to show a void ratio from 0.10 to 0.86 and a density from 1.00 to 6.56 g/cm³. Japanese Patent Application Laid-Open No. H11-283627 proposes a lithium secondary battery that uses a negative electrode containing silicon and tin having an amorphous phase. Japanese Patent Application Laid-Open No. 2000-311681 proposes a lithium secondary battery that uses a negative electrode made of particles of amorphous tin and an alloy of a transitional metal to show a non-stoichiometric composition. International Publication No. WO00/17949 also proposes a lithium secondary battery that uses a negative electrode made of particles of amorphous silicon and an alloy of a transitional metal to show a non-stoichiometric composition.

Japanese Patent Application Laid-Open No. 2000-215887 proposes a lithium secondary battery that has a high capacity and shows a high charging-discharging efficiency achieved by forming a carbon layer on the surfaces of metal or half-metal particles, particularly silicon particles, that can form an alloy with lithium by a chemical deposition process involving thermal decomposition of benzene to raise the thermal conductivity and suppress the expansion of the volume when forming the lithium alloy for the purpose of preventing destruction of the electrode. However, the above cited proposal for a lithium secondary battery using such an alloy type negative electrode is accompanied by drawbacks including that the surfaces of silicon particles cannot be coated uniformly by a chemical deposition process involving thermal decomposition and that the thermal decomposition temperature is high and apt to give rise to oxidation of silicon particles. Therefore, the problem that the internal resistance increases as the charging/discharging cycle is repeated, and consequently the rate of taking out electricity gradually falls is not dissolved sufficiently in comparison with a lithium secondary battery having a graphite electrode.

The negative electrode of a lithium secondary battery that is formed by using powder of a metal selected from silicon, tin and an alloy thereof that can store and discharge lithium by electrochemical reaction and a binder expands as the battery is charged, and the negative electrode contracts as the battery is discharged. Then, as the expansion/contraction cycle is repeated, the contact of the metal particles is decreased to allow metal particles to fall and the current collector to peel off from the electrode layer probably because the reaction of forming an alloy of metal particles and lithium unevenly takes place during charging. Although attempts have been made to improve the uneven reaction and make it more uniform by mixing the material of the negative electrode with carbon particles such as graphite particles, the electrochemical reaction relating to the charging/discharging operations of the lithium secondary battery does not take place uniformly in the electrode layer because of the difference of electric storage capacity and volume expansion between metal particles and carbon particles in the case of increasing the amount of lithium that is stored in the negative electrode during charging (metal particles are units of metal powder and carbon particles are units of carbon powder).

Thus, there is a demand for development of negative electrodes that can provide a long service lifetime in order to dissolve the above-described problems.

SUMMARY OF THE INVENTION

In view of the above-described points, the object of the present invention is to provide an electrode structure to be used for a lithium secondary battery that shows a small capacity reduction even when the charging/discharging cycle is repeated and has a high capacity and a high energy density, and a lithium secondary battery including such an electrode structure.

In the first aspect of the present invention, there is provided an electrode structure for a lithium secondary battery, including: a main active material layer of a metal powder of a material selected from the group consisting of silicon, tin and an alloy thereof that can store and discharge lithium by electrochemical reaction, and a binder of an organic polymer; and a current collector;

wherein the main active material layer further includes at least a powder of a support material for supporting the electron conduction of the main active material in addition to the metal powder;

the powder of the support material are particles having a spherical, pseudo-spherical or pillar shape with an average particle size of 0.3 to 1.35 times the average thickness of the main active material layer; and the support material includes one or more materials selected from the group consisting of graphite, an oxide of a transitional metal selected from $TiO_2$, $MoO_3$ and $WO_3$, a metal electrochemically not forming an alloy with Li which is selected from Cu, Ni, Co, Ti, Fe, Cr, Mo, W, Pd, Pt and Au and an alloy thereof.

In the second aspect of the present invention, there is also provided an electrode structure for a lithium secondary battery, including: a main active material layer including a metal powder of a material selected from the group consisting of silicon, tin and an alloy thereof that can store and discharge lithium by electrochemical reaction, and a binder of an organic polymer; and a current collector;

wherein (a) the main active material layer further includes at least a powder of a support material for supporting the electron conduction of the main active material layer in addition to the metal powder; the powder of the support material are particles having a spherical, pseudo-spherical or pillar shape with an average particle size of 0.3 to 1.35 times the thickness of the main active material layer; the support material includes one or more materials selected from the group consisting of graphite, an oxide of a transitional metal selected from $TiO_2$, $MoO_3$ and $WO_3$, a metal electrochemically not forming an alloy with Li which is selected from Cu, Ni, Co, Ti, Fe, Cr, Mo, W, Pd, Pt and Au and an alloy thereof; and wherein (b) an electron-conductive buffer layer is arranged between the current collector and the main active material layer of the electrode structure; the buffer layer includes at least a binder of an organic polymer, and particles of one or more materials selected from the group consisting of a conductive polymer, graphite, a metal electrochemically not forming an alloy with Li which is selected from Cu, Ni, Co, Ti, Fe, Cr, Mo, W, Pd, Pt and Au and an alloy thereof, and an oxide of a transitional metal selected from $TiO_2$, $MoO_3$ and $WO_3$; and the average particle size of the particles is 0.5 µm to 10 µm.

In the third aspect of the present invention, there is also provided an electrode structure for a lithium secondary battery, including: a main active material layer including a metal powder of a material selected from the group consisting of silicon, tin and an alloy thereof that can store and discharge lithium by electrochemical reaction, and a binder of an organic polymer; and a current collector;

wherein (a) the main active material layer further includes at least a powder of a support material for supporting the electron conduction of the main active material layer in addition to the metal powder; the powder of the support material are particles having a spherical, pseudo-spherical or pillar shape with an average particle size of 0.3 to 1.35 times the thickness of the main active material layer; the support material includes one or more materials selected from the group consisting of graphite, an oxide of a transitional metal selected from $TiO_2$, $MoO_3$ and $WO_3$, a metal electrochemically not forming an alloy with Li which is selected from Cu, Ni, Co, Ti, Fe, Cr, Mo, W, Pd, Pt and Au and alloy thereof;

wherein (c) a surface coat layer is arranged on the surface of the main active material layer; the surface coat layer has electron conductivity and ion transmissibility or ionic conductivity; the surface coat layer includes at least a binder of an organic polymer, and particles of one or more materials selected from the group consisting of a conductive polymer, amorphous graphite, graphite, a metal electrochemically not forming an alloy with Li which is selected from Cu, Ni, Co, Ti, Fe, Cr, Mo, W, Pd, Pt and Au and an alloy thereof, and an oxide of a transitional metal selected from $TiO_2$, $MoO_3$ and $WO_3$; and the average particle size of the particles is 0.5 µm to 10 µm.

In the fourth aspect of the present invention, there is also provided an electrode structure for a lithium secondary battery, including: a main active material layer including a metal powder of a material selected from the group consisting of silicon, tin and an alloy thereof that can store and discharge lithium by electrochemical reaction, and a binder of an organic polymer; and a current collector;

wherein (a) the main active material layer further includes at least a powder of a support material for supporting the electron conduction of the main active material layer in addition to the metal powder; the powder of the support material are particles having a spherical, pseudo-spherical or pillar shape with an average particle size of 0.3 to 1.35 times the thickness of the main active material layer; the support material includes one or more materials selected from the group consisting of graphite, an oxide of a transitional metal selected from $TiO_2$, $MoO_3$ and $WO_3$, a metal electrochemically not forming an alloy with Li which is selected from Cu, Ni, Co, Ti, Fe, Cr, Mo, W, Pd, Pt and Au and an alloy thereof;

wherein (b) an electron-conductive buffer layer is arranged between the current collector and the main active material layer of the electrode structure; the buffer layer includes at least a binder of an organic polymer, and particles of one or more materials selected from the group consisting of a conductive polymer, graphite, a metal electrochemically not forming an alloy with Li which is selected from Cu, Ni, Co, Ti, Fe, Cr, Mo, W, Pd, Pt and Au and an alloy thereof, and an oxide of a transitional metal selected from $TiO_2$, $MoO_3$ and $WO_3$; the average particle size of the particles is 0.5 µm to 10 µm; and wherein (c) a surface coat layer is arranged on the surface of the main active material layer; the surface coat layer has electron conductivity and ion transmissibility or ionic conductivity; the surface coat layer includes at least a binder of an organic polymer, and particles of one or more materials selected from the group consisting of a conductive polymer, amorphous graphite, graphite, a metal electrochemically not forming an alloy with Li which is selected from Cu, Ni, Co, Ti, Fe, Cr, Mo, W, Pd, Pt and Au and an alloy thereof, and an oxide of a transitional metal selected from $TiO_2$, $MoO_3$ and $WO_3$; and the average particle size of the particles is 0.5 µm to 10 µm.

In the fifth aspect of the present invention, there is provided a secondary battery including a negative electrode formed by using the above-described electrode structure, a lithium ion conductor, and a positive electrode, wherein an oxidation reaction of lithium and a reduction reaction of lithium ions are utilized.

The present invention has been achieved under the above-described circumstances, and the first feature of the present invention is that, in an electrode structure to be used for a lithium secondary battery, the electrode structure includes: a main active material layer including a metal powder of a material selected from the group consisting of silicon, tin and an alloy thereof that can store and discharge lithium by electrochemical reaction, and a binder of an organic polymer; and a current collector; wherein the main active material layer further includes at least a powder of a support material for supporting the electron conduction of the main active material layer in addition to the metal powder; and the powder of the support material has a spherical, pseudo-spherical or pillar shape with an average particle size of 0.3 to 1.35 times the thickness of the main active material layer. Preferably, the support material includes one or more materials selected from the group consisting of graphite, an oxide of a transitional metal (which is selected from $TiO_2$, $MoO_3$ and $WO_3$), a metal electrochemically not forming an alloy with Li (which is selected from Cu, Ni, Co, Ti, Fe, Cr, Mo, W, Pd, Pt and Au and an alloy thereof). More preferably, the support material is graphite. Preferably, the average particle size of the primary particles that form the particles of the metal of the main active material layer selected from silicon, tin and alloys of the elements is 0.02 µm to 5 µm. Preferably, the ten point average height Rz showing the surface roughness of the current collector is 0.7 µm to 3 µm.

The second feature of the present invention is that an electron-conductive buffer layer that expands only little during the charging operation is arranged between the current collector and the main active material layer of the electrode structure; and the buffer layer includes at least a binder of an organic polymer, and particles of one or more materials selected from the group consisting of a conductive polymer, graphite, a metal electrochemically not forming an alloy with Li (which is selected from the group consisting of Cu, Ni, Co, Ti, Fe, Cr, Mo, W, Pd, Pt and Au and an alloy thereof), and an oxide of a transitional metal (which is selected from $TiO_2$, $MoO_3$ and $WO_3$), and the average particle size of the particles is 0.5 µm to 10 µm.

The third feature of the present invention is that a surface coat layer is arranged on the surface of the main active material layer in order to alleviate the concentration of electric field that occurs during the charging/discharging operation; the surface coat layer has electron conductivity and ion transmissibility or ionic conductivity; the surface coat layer includes at least a binder of an organic polymer, and particles of one or more materials selected from the group consisting of a conductive polymer, graphite, a metal electrochemically not forming an alloy with Li (which is selected from the group consisting of Cu, Ni, Co, Ti, Fe, Cr, Mo, W, Pd, Pt and Au and an alloy thereof) and an oxide of a transitional metal (which is selected from $TiO_2$, $MoO_3$ and $WO_3$); and the average particle size of the particles is preferably 0.5 µm to 10 µm.

Another feature of the present invention is that the same binder is used for the main active material layer, the buffer layer and the surface coat layer.

The fourth feature of the present invention is that a conductive organic polymer is dispersed in the binder.

Still another feature of the present invention is that there is provided a secondary battery including: a negative electrode formed by using the above-described electrode structure, an electrolyte, and a positive electrode, wherein an oxidation reaction of lithium and a reduction reaction of lithium ions are utilized, and that the powder of the support material in the main active material layer of the negative electrode shows an expansion coefficient of 1.5 times or less based on powder before charging in the direction toward the oppositely disposed positive electrode.

The fifth feature of the present invention is that, in an electrode structure to be used for a lithium secondary battery, the electrode structure includes: a main active material layer including a metal powder of a material selected from the group consisting of silicon, tin and an alloy thereof that can store and discharge lithium by electrochemical reaction, and hard carbon (non-graphitic carbon material) powder or graphite carbon power, and a binder of an organic polymer; and a current collector, wherein the metal powder and the carbon powder are compounded by a material having a "link" function of carrying out the chemical bond or electron conduction between the metal powder and the carbon powder (hereinafter, referred to as "link material").

BRIEF DESCRIPTION OF THE DRAWINGS

FIG. 8 is a schematic cross-sectional view of a spiral type cylindrical battery.

DESCRIPTION OF THE PREFERRED EMBODIMENTS

The inventors of the present invention have achieved the present invention as a result of elaborate studies on alloy-based negative electrodes for lithium secondary batteries. In lithium secondary batteries where the negative electrode is an electrode prepared by forming an active material layer of powder of metal silicon or tin or an alloy thereof and a binder on a current collector of a metal foil, the internal resistance of the battery increases as a result of repetitive charging/discharging cycles to consequently degrade the performance of the battery. The inventors of the present invention observed and analyzed the active material layer of the negative electrode to obtain a presumption that the increase of the internal resistance is attributable to a cause as described below. The powder of metal silicon or tin or an alloy thereof electrochemically forms an alloy with lithium during the charging operation but the alloy formation does not take place uniformly. Thus, the expansion due to the lithium alloy formation occurs unevenly so that "voids" and cracks generates near the surface of and in the active material layer and in a region of the interface of the active material layer and the current collector. As "voids" and cracks appear, the electron conduction in the active material layer of the negative electrode is blocked to increase the electric resistance of the electrode. This is probably attributable to the very large expansion at the time of the formation of the alloy of lithium and powder of metal silicon or tin or an alloy thereof. Although the expansion at the time of the formation of the lithium alloy can be suppressed by reducing a lithium amount for forming an alloy, the capacity that the battery can store is also reduced.

Thus, in order to prevent the generation of "voids" and cracks, the inventors of the present invention devised an electrode structure by (1) dispersing a support material that can maintain electron conduction even when the powder of metal silicon or tin or an alloy thereof in the active material layer expands, (2) compounding the binder with a conductive organic polymer to improve the electron conduction of the binder, (3) arranging a conductive buffer layer between the current collector and the active material layer that can ensure electron conduction between the active material layer and the current collector even when the powder of metal silicon or tin or an alloy thereof in the active material layer expands, and (4) arranging a surface coat layer showing expansion less than the metal silicon or tin or an alloy thereof in the active material layer and also ion transmissibility and electron conductivity in order to suppress the unevenness of expansion at the surface of the electrode layer.

Now, embodiments of the present invention will be described below with referring to FIGS. 1A through 5B.

Figure 1A:
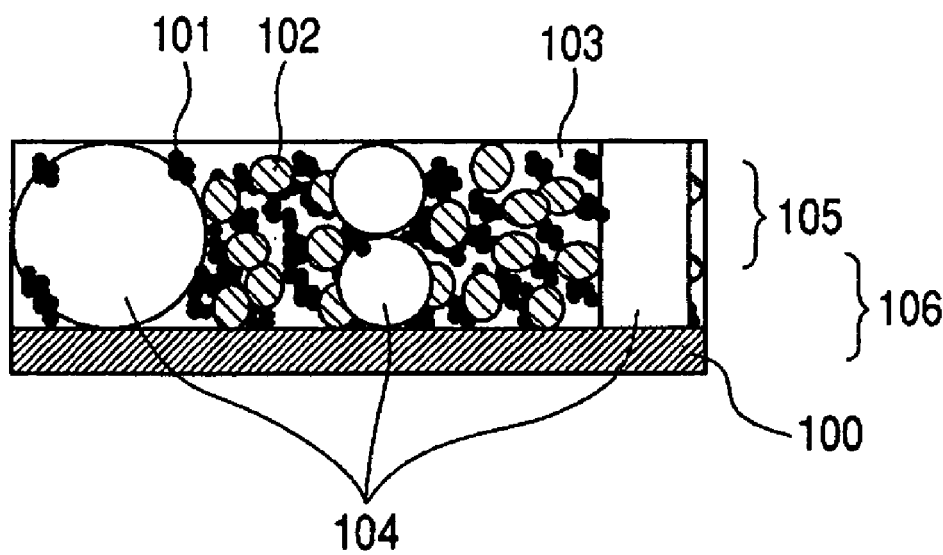
FIG. 1A is a schematic cross-sectional view of an embodiment of the electrode structure according to the present invention.
Figure 1B:
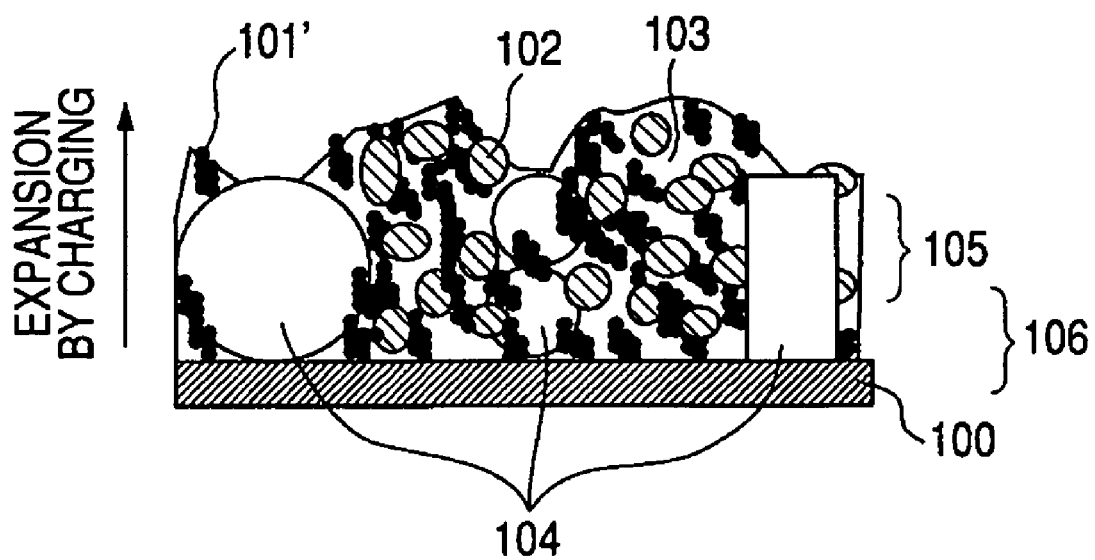
FIG. 1B is a schematic cross-sectional view showing the state of the present electrode structure during the charging operation.

Referring to FIGS. 1A and 1B, there are shown a current collector 100, particles of silicon or tin or an alloy containing either of the elements 101, particles of an auxiliary conductive material 102, a binder 103, particles of a support material 104, a main active material layer 105 and an electrode structure 106. In FIG. 1B, reference character 101' denotes particles of silicon or tin or an alloy containing either of the elements that expanded as a result of forming an alloy with lithium.

Figure 2:
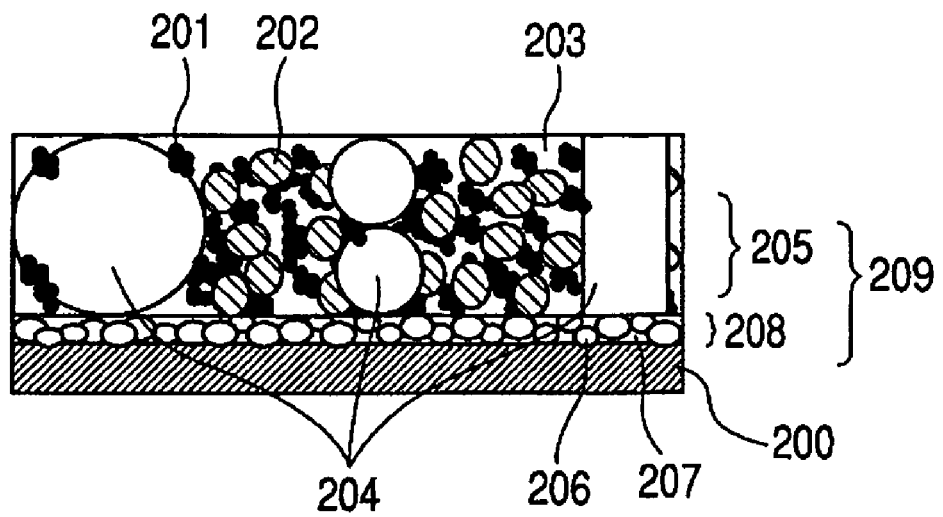
FIG. 2 is a schematic cross-sectional view of another embodiment of the electrode structure according to the present invention.

Now, referring to FIG. 2, there are shown a current collector 200, particles of silicon or tin or an alloy containing either of the elements 201, particles of an auxiliary conductive material 202, a binder 203, particles of a support material 204, a main active material layer 205, electron conducting particles 206, a binder 207, a buffer layer 208, and an electrode structure 209.

Figure 3:
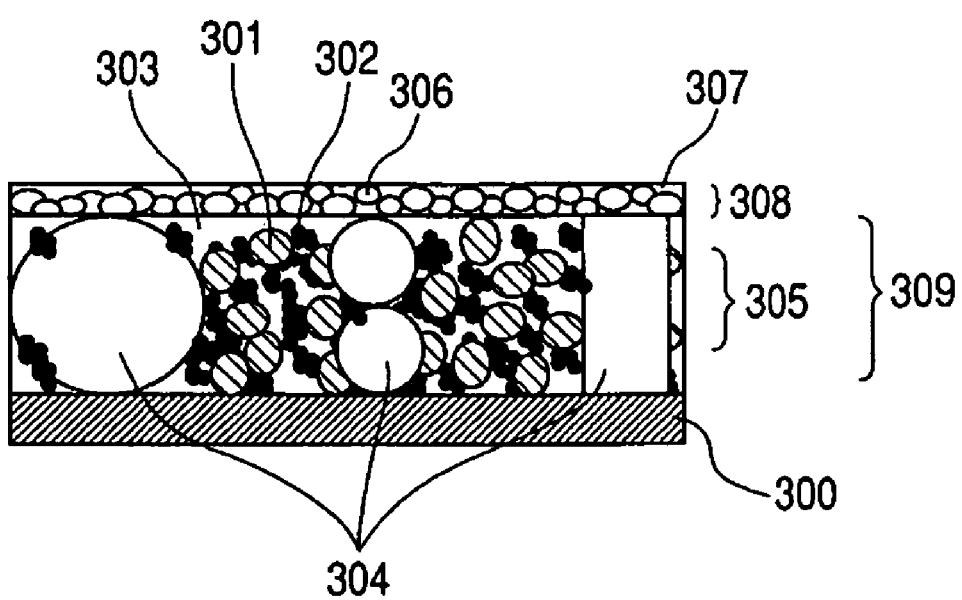
FIG. 3 is a schematic cross-sectional view of still another embodiment of the electrode structure according to the present invention.

Referring to FIG. 3, there are shown a current collector 300, particles of silicon or tin or an alloy containing either of the elements 301, particles of an auxiliary conductive material 302, a binder 303, particles of a support material 304, a main active material layer 305, ion conducting or electron conducting particles 306, a binder 307, a lithium-ion-transmitting surface coat layer 308, and an electrode structure 309.

Figure 4A:
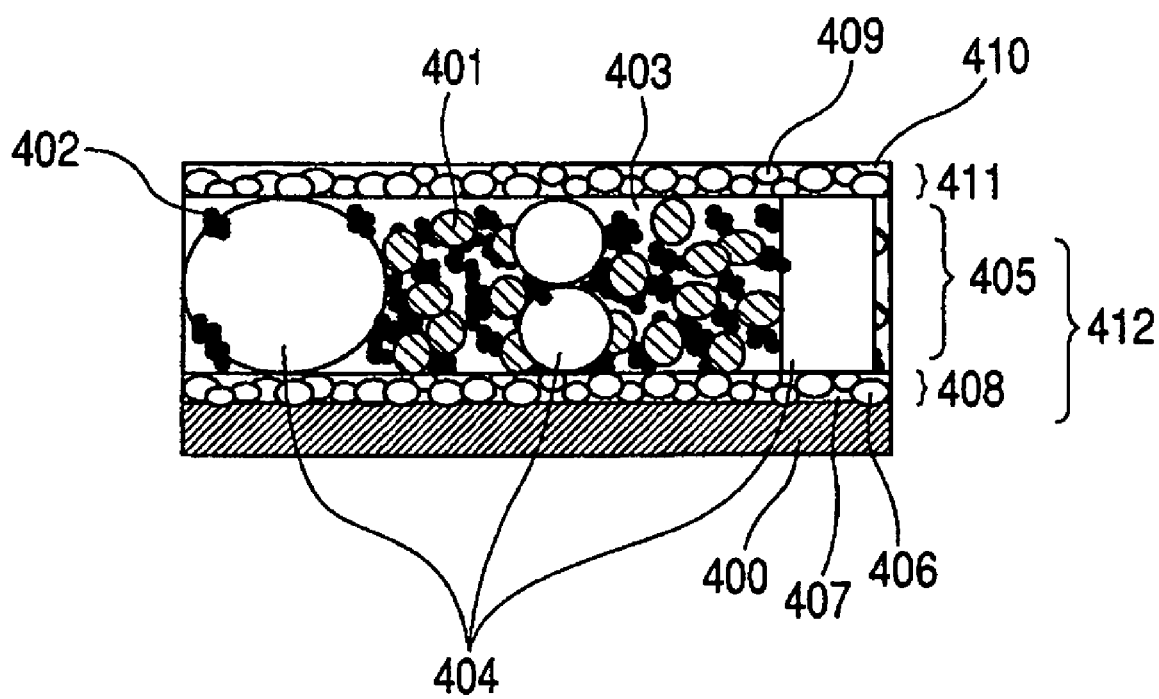
FIGS. 4A and 4B are schematic cross-sectional views of still another embodiment of the electrode structure according to the present invention.
Figure 4B:
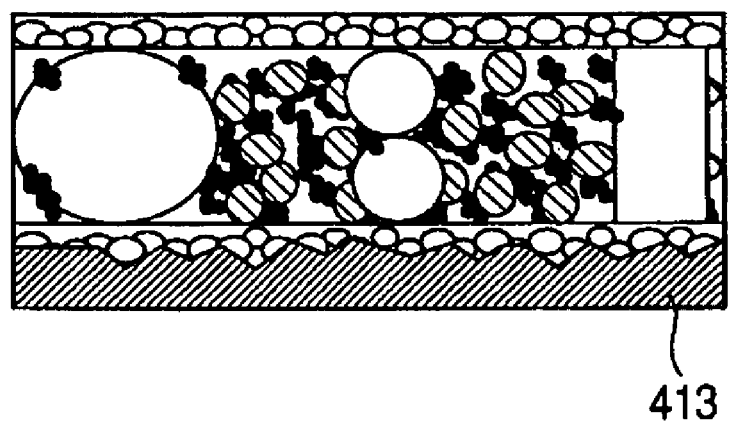

Referring then to FIGS. 4A and 4B, there are shown a current collector 400, particles of silicon or tin or an alloy containing either of the elements 401, particles of an auxiliary conductive material 402, a binder 403, particles of a support material 404, a main active material layer 405, electron conducting particles 406, a binder 407, a buffer layer 408, ion conducting or electron conducting particles 409, a binder 410, a lithium-ion-transmitting surface coat layer 411, an electrode structure 412, and a surface-coarsened current collector 413.

Figure 5A:
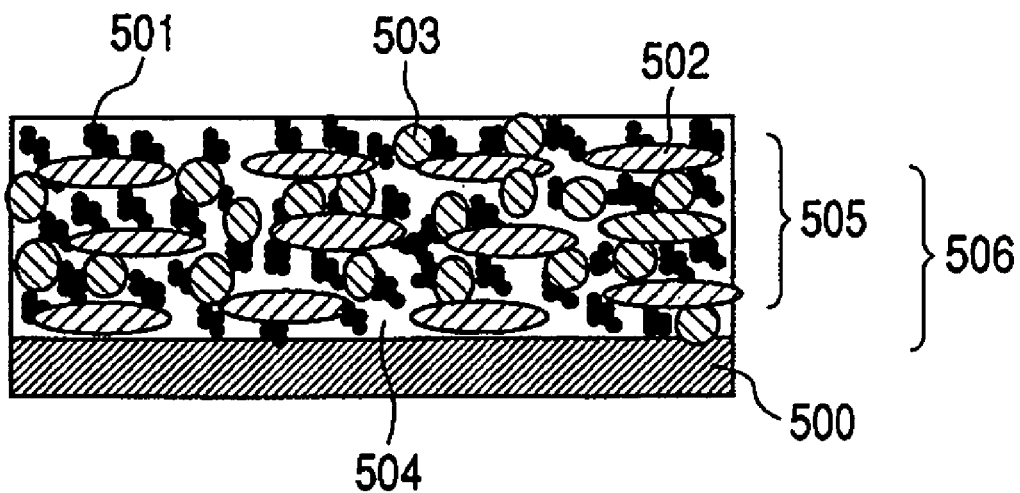
FIG. 5A is a schematic cross-sectional view of still another embodiment of the present electrode structure where flat graphite particles are compounded.
Figure 5B:
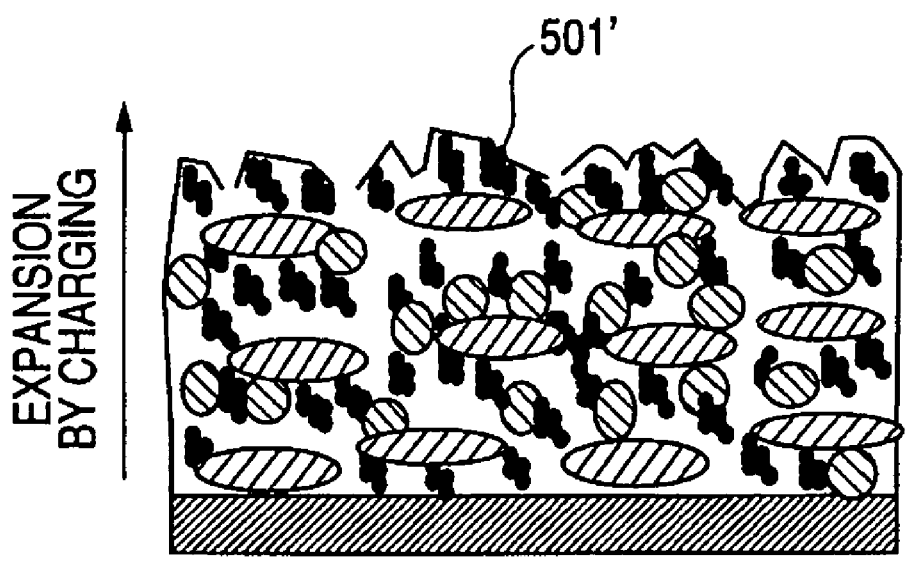
FIG. 5B is a schematic cross-sectional view showing the state of the present electrode structure during the charging operation.

Referring finally to FIGS. 5A and 5B, there are shown a current collector 500, particles of silicon or tin or an alloy containing either of the elements 501, flat particles of an auxiliary conductive material 502, particles of an auxiliary conductive material 503, a binder 504, a main active material layer 505, an electrode structure 506, and particles of silicon or tin or an alloy containing either of the elements that expanded as a result of forming an alloy with lithium 501'.

Thus, FIG. 1A is a schematic cross-sectional view of an embodiment of electrode structure 106 formed by introducing a support material 104, which has particle sizes comparable to the thickness of the main active material layer 105 and assists the electron conduction in vertical and horizontal directions in the main active material layer, into the main active material layer 105 that is formed by particles of silicon or tin or an alloy of either of them 101, particles of an auxiliary conductive material 102 (for assisting electron conduction among particles) and a binder 103. As the technique for introducing the support material 104, the powder of the support material is added to and mixed with the powder of metal silicon or tin or an alloy of either of them, the powder of the auxiliary conductive material and the binder at the time of forming a main active material layer on the current collector.

FIG. 1B is an imaginary schematic cross-sectional view of the electrode structure of FIG. 1A when the lithium secondary battery prepared by combining the electrode structure that operates as a negative electrode with a positive electrode is electrically charged and lithium forms an alloy with particles of silicon or tin or an alloy of either of them as a result of electrochemical reaction to expand the particles.

FIG. 5A is a schematic cross-sectional view of an embodiment of electrode structure in which the active material layer is formed by introducing flat particles of an auxiliary conductive material in place of the support material of FIG. 1A. FIG. 5B is an imaginary schematic cross-sectional view of the electrode structure of FIG. 5A when the lithium secondary battery prepared by combining the electrode structure that operates as a negative electrode with a positive electrode is electrically charged and lithium forms an alloy with particles of silicon or tin or an alloy of either of them as a result of electrochemical reaction to expand the particles.

By comparing FIG. 1B and FIG. 5B, it will be seen that the fall of electron conduction is reduced and hence the rise of electric resistance is suppressed at the time of electrode reaction due to the presence of particles of a support material 104 in the electrode structure of FIG. 1A in comparison with the electrode structure of FIG. 5A. Additionally, the charging-discharging efficiency (Coulombic efficiency) is improved and the cycle life is prolonged when a conductive polymer is compounded with the binder of FIG. 1B because electron conduction is maintained by means of the network of the binder (not shown).

FIG. 2 is a schematic cross-sectional view of an embodiment of electrode structure according to the present invention, where an electron conducting buffer layer is arranged between the current collector and the main active material layer of the electrode structure. When the electrode structure of FIG. 2 is used as the negative electrode of a lithium secondary battery, the electron conduction between the main active material layer, which expands at the time of charging operation, and the current collector is assisted by the buffer layer that expands only to a small extent. Additionally, unlike the electrode structure of FIG. 1A, the stress of the interface between the current collector and the main active material layer is alleviated and distributed uniformly because the buffer layer that is made of a binder of an organic polymer is arranged between the current collector and the main active material layer. Thus, the main active material layer is prevented from peeling off from the current collector, if partly, and the deformation of the current collector that is produced by stress is suppressed. Preferably, the binder of the main active material layer and that of the buffer layer are made of the same material(s) or material(s) of the same quality because then the interface of the buffer layer and the main active material layer is formed continuously.

FIG. 3 is a schematic cross-sectional view of another embodiment of electrode structure according to the present invention formed by arranging a surface coat layer on the surface of the main active material layer of an electrode structure as shown in FIG. 1A. When a lithium secondary battery is formed by using an electrode structure as shown in FIG. 3 as a negative electrode and charged, the expansion of the main active material layer is made uniform and the electron conduction parallel to the current collector is apt to be maintained at the time of electrochemical reaction because the surface coat layer 306 that expands only to a small extent by charging and shows electron conductivity is arranged to uniformize the electric field intensity that is applied to the surface of the electrode structure of FIG. 3 at the time of charging. Thus, the electric resistance of the electrode structure can be minimized when it expands by charging.

FIGS. 4A and 4B are schematic cross-sectional views of still another embodiment of electrode structure according to the present invention, in which an electron conducting buffer layer is arranged between the current collector and the main active material layer and a surface coat layer is arranged on the surface of the main active material layer. FIG. 4A shows that the embodiment includes a current collector whose surface is planar, while FIG. 4B shows that the embodiment includes a current collector whose surface is coarsened. When a current collector having a coarsened surface is used, the area of the interface thereof is increased to reduce the stress that arises between the main active material layer and the current collector at the time of charging/discharging. However, fissures can appear in the current collector as the charging/discharging cycle of the lithium secondary battery is repeated if the undulations of the surface are large and not uniform because stress is not applied uniformly to the current collector. Therefore, the ten point average height Rz showing the surface coarseness of the current collector is preferably 0.5 μm to 5 μm, more preferably 0.7 μm to 3 μm.

[Main Active Material Layer]

For the main active material layer of an electrode structure to be used as the negative electrode of a lithium secondary battery, firstly a main active material, a powder of a support material, a powder of an auxiliary conductive material and a binder are mixed, and optionally a solvent for the binder is added to the mixture, which mixture is then kneaded to prepare slurry of the mixture. Subsequently, the prepared slurry is applied onto a current collector or a buffer layer, which will be described later, and dried to form an electrode layer, which is optionally subjected to a press process to regulate the thickness and the density of the electrode layer to produce an electrode structure. Typical techniques that can be used to apply the slurry for the purpose of the present invention include a coater application method and a screen printing method. Alternatively, it is also possible to form an electrode material layer by molding a main material, the powder of the support material, the powder of the auxiliary conductive material and the binder on a current collector or a buffer layer without adding a solvent under pressure. For the purpose of the present invention, the density of the electrode material layer is preferably within a range from 0.7 to 2.0 g/cm$^3$, more preferably within a range from 0.9 to 1.5 g/cm$^3$. If the density of the electrode material layer is too large, the expansion of the electrode layer becomes excessive at the time of lithium introduction to allow the electrode layer to peel off from the current collector. If, on the other hand, the density of the electrode material layer is too small, the resistance of the electrode becomes large, which in turns reduces the charging-discharging efficiency and produces a large voltage fall at the time of discharging the battery.

(Main Active Material)

Metal particles of silicon, tin or an alloy thereof are preferably used for the main active material of the main active material layer. Preferably, the metal particles (alloy particles) contain a transition metal element and are compounded with carbon. Preferably, the metal particles (alloy particles) have a crystal size of 60 nm or less. More preferably, they are amorphous particles having a size of 20 nm or less. For the purpose of the present invention, the crystal size of particles is determined from the half width of the peak of the X-ray diffraction curve and the diffraction angle obtained by using an X-ray radiation source of CuKα and also the Scherrer's formula shown below:

$$Lc=0.94\lambda/(\beta \cos \theta) \quad \text{(Scherrer's formula)},$$

Wherein Lc: crystal size
λ: wavelength of X-ray beam
β: half width of the peak (radian)
θ: Bragg angle of diffraction line.

The average particle size of the primary particles of the metal particles (alloy particles) of the main active material is preferably within a range from 0.02 μm to 5 μm, more preferably within a range from 0.1 μm to 3 μm.

(Coating of Metal Powder Selected from Silicon, Tin or an Alloy Thereof and Capable of Storing and Discharging Lithium by Electrochemical Reaction)

Preferably, the particles of silicon, tin or an alloy thereof are coated with a material selected from pitch, pitch coke, petroleum coke, coal tar, fluoranthene, pyrene, chrysene, phenanthrene, anthracene, naphthalin, fluorene, biphenyl and acenaphthene and subsequently carbonized in an inert gas atmosphere so that the particles are coated with a carbonized layer. Of the above listed materials to be carbonized, pitch, pitch coke, petroleum coke and coal tar provide an advantage of easiness of coating particles of the main active material because they show a low melting point. Additionally, they also provide an advantage of a low carbonization temperature that facilitates the operation of coating with a carbonized layer without reducing the lithium occlusion performance of particles of the main active material. Still additionally, they are inexpensive. The ratio of the carbonized coat layer in the particles of silicon, tin or an alloy thereof is preferably within a range from 1 to 10 wt %, more preferably within a range from 2 to 5 wt % from the viewpoint of not sacrificing the lithium occlusion capacity of silicon, tin or an alloy thereof, assisting the inter-particle electron conduction and suppressing oxidation. A reduction reaction of depriving oxygen atoms from the partly oxidized particles of silicon, tin or an alloy thereof takes place in the above-described carbonization process to reduce the quantity of the oxide that gives rise to an irreversible reaction with lithium. The inert gas that is used in the carbonization process is selected from argon gas, nitrogen gas and carbon dioxide gas. The carbonization temperature is preferably within a range from 400° C. to 900° C., more preferably within a range from 500° C. to 800° C. because carbonization is accelerated while crystallization of silicon, tin or an alloy thereof is retarded within the-temperature range.

The metal powder selected from silicon, tin or an alloy thereof and capable of storing and discharging lithium by electrochemical reaction are preferably a powder of particles having a coating on a part of the surface or the whole surface, the coating being composed of $TiO_2$, $MoO_3$ or $WO_3$ or an oxide which is formed by substituting a part of Ti, Mo or W of these metal oxides by another metal element. Because the above-described metal oxides have a stable structure and easily carry out the electrical insertion and elimination of lithium ion, in the lithium secondary battery including the negative electrode mainly composed of a metal powder selected from silicon, tin or an alloy thereof, it is possible to prevent lithium ions from depositing as reduced and active lithium metal on the metal powder selected from silicon, tin or an alloy thereof. As the result, reduction of the charging/discharging performance due to repetition of charging and discharging of the battery can be prevented to prolong the cycle life.

The coating on the metal oxide can be formed by mixing the metal powder selected from silicon, tin or an alloy thereof with the above-described metal oxide in a grinder such as a ball mill. Also, it is possible to form the coating by mixing the metal powder selected from silicon, tin or an alloy thereof with a solution of polytitanic acid, polytungstic acid, polymolybdic acid, polytitanic acid peroxide, polytungstic acid peroxide, polymolybdic acid peroxide which are the raw material of the metal oxide.

Further, it is preferable to coat a part of surface or the whole surface of the metal powder selected from silicon, tin or an alloy thereof with a conductive polymer having conjugated double bonds of carbon-carbon where single bond and double bond alternate. When the negative electrode of a lithium secondary battery is formed using a binder, this coating makes it possible to increase the affinity of the binder and the metal powder selected from silicon, tin or an alloy thereof and uniformly disperse them in the electrode layer of the negative electrode to obtain a stable negative electrode performance.

Furthermore, lithium ions can be electrically inserted into and eliminated from the conductive polymer and therefore the same effect as of the metal oxide can be obtained. As the conductive polymer, a polymer obtained by polymerizing thiophene derivatives, pyrrole derivatives, aniline derivatives, acetylene derivatives, or the like. Additionally, the conductive polymer is more preferably a composite compound with a surfactant in order to obtain affinity of the conductive polymer and the binder. The coating of the conductive polymer can be formed by mixing the metal powder with a solution of the conductive polymer.

(Support Material)

The support material of the main active material layer is preferably one or more materials selected from the group consisting of graphite, an oxide of a transitional metal (which is selected from $TiO_2$, $MoO_3$ and $WO_3$), a metal electrochemically not forming an alloy with Li (which is selected from the group consisting of Cu, Ni, Co, Ti, Fe, Cr, Mo, W, Pd, Pt and Au and alloys thereof). More preferably, the support material is selected from graphite and oxides of a transitional metal (selected from $TiO_2$, $MoO_3$ and $WO_3$) from the viewpoint of suppressing the growth of dendrite of lithium in the charging operation. Graphite and oxides of transitional metals selected from $TiO_2$, $MoO_3$ and $WO_3$ can occlude lithium between layers thereof. Graphite and oxides of a transitional metal selected from $MoO_3$ and $WO_3$ are further more preferable because of a small potential difference between them and metal lithium at the time of occluding lithium. Among the above listed materials, graphite is most preferable as the support material to be used in the present invention because it can hold electrolyte solution. For the purpose of the present invention, the powdery supporting material is provided preferably as particles having a spherical, pseudo-spherical or pillar shape. The average size of particle (secondary particles) of the support material is preferably from 0.3 to 1.35 times, more preferably from 0.6 to 1.2 times of the average thickness of the main active material layer for the purpose of ensuring electron conduction in the main active material layer when the min active material layer expands in the charging operation.

(Auxiliary Conductive Material)

Materials that can be used for the auxiliary conductive material of the main active material layer include amorphous carbon materials such as acetylene black, and ketjen black; carbon materials such as a graphite structure carbon; nickel, copper, silver, titanium, platinum, aluminum, cobalt, iron and chromium, and particularly graphite is preferable because it can hold electrolyte solution and shows electron conductivity and a large specific surface area. The preferable shape of particles of the auxiliary conductive material may be spherical, flake-shaped, filament-shaped, fiber-shaped, spike-shaped or needle-shaped. It is possible to raise the packing density and lower the impedance of the electrode structure by using powder of the auxiliary conductive material having two or more different shapes when forming the electrode material layer. The average size of particle (secondary particles) of the auxiliary conductive material is preferably 10 μm or less, more preferably 5 μm or less.

As the auxiliary conductive material for use in the negative electrode of a lithium secondary battery, which is mainly composed of a metal powder selected from silicon, tin or an alloy thereof and capable of storing and discharging lithium by electrochemical reaction, a metal powder having characteristics of so-called super elastic alloys which are obtained by heat-treating the powder of a intermetallic compound of Ni—Ti (for example, at a temperature of 480° C.) is preferably used. In the lithium secondary battery including a negative electrode composed of a metal powder selected from silicon, tin or an alloy thereof, an electric amount to be charged is large and a negative electrode expands and contracts during charging and discharging, but use of the above-described auxiliary conductive material in the negative electrode makes it possible to prevent reduction of the collecting performance of the negative electrode due to the expansion and contraction of the negative electrode, thereby preventing reduction of battery performance due to repetition of charging and discharging.

(Binder)

Materials that can be used for the binder of the main active material layer include organic polymer materials such as polyimideamides, polyimides, polyimide precursors (polyamic acid before polyimide formation, or imperfectly formed polyimides), styrene-butadiene rubber, and denatured polyvinyl alcohol-based resins with reduced water-absorbing property. Particularly, a polyimide precursor (polyamic acid before polyimide formation, or an imperfectly formed polyimide) is preferably used for binding silicon alloy powder and turned to a perfect polyimide by heat-treating it at 150 to 300° C. after application of the electrode layer.

The content of the binder in the main active material layer is preferably 2 to 20 wt %, more preferably 5 to 10 wt %.

Since the organic polymers to be used for the binder such as polyimideamides, polyimides, polyimide precursors (polyamic acid before polyimide formation, or imperfectly formed polyimides), styrene-butadiene rubber, and denatured polyvinyl alcohol-based resins with reduced water-absorbing property are poorly electron conductive, any of them is preferably used by adding a conductive polymer having alternately arranged carbon-carbon double bonds and single bonds of —C=C—C=C— to reduce the resistance of the electrode. Since conductive polymers show a strong affinity for any of the above listed organic polymers, such a conductive polymer added to the organic polymer makes it possible to realize more uniform composite material formation. The conductive polymer is added to the organic polymer of the binder preferably at an amount from 1 to 20 based on 100 of the binder by weight from the viewpoint of maintaining the binding force and reducing the electric resistance. The conductive polymer is added to the organic polymer more preferably at an amount from 2 to 10 based on 100 of the binder by weight in order to raise the electric conductivity without reducing the binding force of the binder. Conductive polymers that can be used for the purpose of the present invention include polymers of thiophene derivative monomers, pyrrole derivative monomers, aniline derivative monomers, acetylene derivative monomers and phenylene derivative monomers. Specific examples of conductive polymers include polythiophene, poly(3-hexylthiophene), poly(2-acetylthiophene), polybenzothiopnene, poly(2,5-dimethylthiophene), poly(2-ethylthiophene), poly(3-carboxylic ethyl thiophene), polythiopheneacetonitrile, poly(3,4-ethylenedioxythiophene), polyisothianaphthene, polypyrrole, polyaniline and polyparaphenylene. When adding the conductive polymer to the organic polymer of the binder, it is added to the binder before mixing it with the active material and the conductive polymer in order to raise the electron conductivity of the binder more effectively.

[Current Collector]

The current collector of an electrode structure according to the present invention takes the role of efficiently supplying an electric current to be consumed in the electrode reaction in the charging operation or collecting the electric current that is generated at the time of discharging operation. Particularly, when an electrode structure according to the present invention is applied to the negative electrode of a secondary battery, the use of a material that shows a high electric conductivity and is inactive relative to battery reactions is preferable. Preferable materials that can be used for the current collector include metal materials formed of one or more metals selected from copper, nickel, iron, stainless steel, titanium and platinum. The use of copper that is inexpensive and shows a low electric resistance is highly preferable. While the current collector has a "plate shape", the thickness of the plate shape of the current collector is not particularly limited so long as it is good for practical applications. In other words, the current collector may include the form of "foil" having a thickness of about 5 μm to 100 μm. Additionally, the plate may include a mesh-like plate, a sponge-like plate, a fiber-like plate, a punched metal plate and an expanded metal plate so long as it has a "plate shape".

As for the surface roughness of the current collector, the ten point average height Rz of the current collector is preferably within a range from 0.5 μm to 5.0 μm, more preferably within a range from 0.7 μm to 3.0 μm in order to maintain the tight adhesion of the electrode layer formed on the current collector. If Rz is greater than the upper limit of the above range, the electrode layer formed on the current collector shows an uneven thickness and can give rise to fissures due to the stress attributable to the expansion/contraction of the main active material layer when it is installed in a lithium secondary battery and subjected to charging/discharging operations. If, on the other hand, Rz is smaller than the lower limit of the above range, the main active material layer can become easily separated from the current collector along the interface due to the stress attributable to the expansion/contraction of the main active material layer when it is installed in a lithium secondary battery and subjected to charging/discharging operations.

[Buffer Layer]

According to the present invention, the buffer layer is arranged between the current collector and the main active material layer and includes at least a binder of an organic polymer, and particles of one or more conductive materials selected from the group consisting of a conductive polymer, graphite, a metal electrochemically not forming any alloy with Li (which is selected from the group consisting of Cu, Ni, Co, Ti, Fe, Cr, Mo, W, Pd, Pt and Au and alloys thereof) and an oxide of a transitional metal (which is selected from $TiO_2$, $MoO_3$ and $WO_3$).

For the buffer layer, firstly a powdery conductive material and a binder are mixed, and optionally a solvent for the binder is added to the mixture, which is then kneaded to prepare slurry of the mixture. Subsequently, the prepared slurry is applied onto a current collector and dried to form an electrode layer, which is optionally subjected to a press process, and regulate the thickness and the density of the electrode layer to produce an electrode structure. Typical techniques that can be used to apply the slurry for the purpose of the present invention include a coater application method and a screen printing method. Alternatively, it is also possible to form an electrode material layer by molding a powdery conductive material and a binder on a current collector without adding a solvent under pressure. For the purpose of the present invention, the density of the electrode material layer is preferably within a range from 0.7 to 2.0 $g/cm^3$, more preferably within a range from 0.9 to 1.5 $g/cm^3$.

The average particle size of the particles of the conductive material is preferably 0.5 μm to 10 μm from the viewpoint of forming the buffer layer with a uniform thickness. If the thickness of the buffer layer is made large, (1) the thickness of the overall electrode layer is made large to reduce the storage capacity of the electrode layer and (2) the expansion coefficient of the buffer layer and that of the main active material layer shows a large difference at the time of charging operation to produce a large stress, which warps the buffer layer and forces it to peel off.

The binder of the buffer layer and the binder of the active material layer are preferably made of the same material(s) or material(s) of the same quality because then an interface is hardly formed between the buffer layer and the main active material layer. If an interface is formed and a stress is produced, the buffer layer can easily peel off from the interface. Materials that can be used for the binder of the buffer layer include organic polymer materials such as polyimideamides, polyimides, polyimide precursors (before polyimide formation, or imperfectly formed polyimides), styrene-butadiene rubber, and denatured polyvinyl alcohol-based resins with reduced water-absorbing property similarly as in the case of the main active material layer. The content of the binder in the buffer layer is preferably 2 to 20 wt %, more preferably 5 to 10 wt %. The above listed organic polymer materials are electrically highly insulating and hence it is preferable to mix a conductive polymer material with it in order to raise the electro-conductivity of the buffer layer. Then, it is possible to achieve a highly uniform composite material formation because conductive polymer has a strong affinity for an organic polymer. The conductive polymer is added to the organic polymer of the binder preferably at an amount from 1 to 20, more preferably at amount from 2 to 10, based on 100 of the binder by weight from the viewpoint of maintaining the binding force and reducing the electric resistance. Conductive polymers that can be used for the purpose of the present invention include polymers of thiophene derivative monomers, pyrrole derivative monomers, aniline derivative monomers, acetylene derivative monomers and phenylene derivative monomers.

[Surface Coat Layer]

According to the present invention, the surface coat layer is arranged on the surface of the main active material layer and has electron conductivity and an ion transmissibility (ionic conductivity). The surface coat layer includes at least a binder of an organic polymer, and particles of one or more materials selected from the group consisting of a conductive polymer, graphite, a metal electrochemically not forming an alloy with Li (which is selected from the group consisting of Cu, Ni, Co, Ti, Fe, Cr, Mo, W, Pd, Pt and Au and alloys thereof), and oxides of a transitional metal (which is selected from $TiO_2$, $MoO_3$ and $WO_3$). Graphite and oxides of a transitional metal selected from $TiO_2$, $MoO_3$ and $WO_3$ are preferable as materials for the particles because they can intercalate lithium for storage. Graphite and oxides of a transitional metal selected from $MoO_3$ and $WO_3$ are more preferable because they show a small potential difference compared with metal lithium at the time of intercalating lithium. The average particle size of the secondary particles of the particles is preferably 0.5 μm to 10 μm from the viewpoint of forming the electrode layer of the electrode structure with a uniform thickness. If the thickness of the coat layer is made large, the thickness of the overall electrode layer is made large to reduce the storage capacity of the electrode layer.

The binder of the buffer layer and the binder of the active material layer are preferably made of the same material(s) or material(s) of the same quality because then an interface is hardly formed between the buffer layer and the main active material layer. If an interface is formed and a stress is produced, the buffer layer can easily peel off from the interface. Materials that can be used for the binder of the buffer layer include organic polymer materials such as polyimideamides, polyimides, polyimide precursors (before polyimide formation, or imperfectly formed polyimides), styrene-butadiene rubber, and denatured polyvinyl alcohol-based resins with reduced water-absorbing property similarly as in the case of the main active material layer. The content of the binder in the buffer layer is preferably 2 to 20 wt %, more preferably 5 to 10 wt %. The above listed organic polymer materials are electrically highly insulating and therefore any of them is preferably used by adding a conductive polymer having alternately arranged carbon-carbon double bonds and single bonds of —C=C—C=C— to raise the electron conductivity. Since conductive polymers show a strong affinity for any of the above listed organic polymers, such a conductive polymer added to the organic polymer makes it possible to realize more uniform composite material formation. The conductive polymer is added to the organic polymer of the binder at an amount of preferably 1 to 20, more preferably 2 to 10, based on 100 of the binder by weight from the viewpoint of maintaining the binding force and reducing the electric resistance. Conductive polymers that can be used for the purpose of the present invention include polymers of thiophene derivative monomers, pyrrole derivative monomers, aniline derivative monomers, acetylene derivative monomers and phenylene derivative monomers.

[Secondary Battery]

Figure 6:
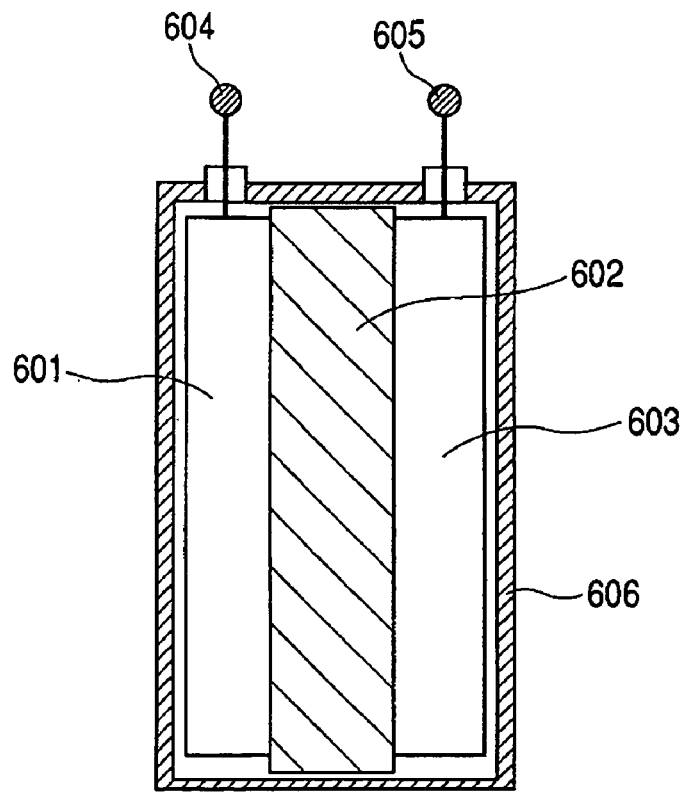
FIG. 6 is a schematic cross-sectional view of an embodiment of a secondary battery (lithium secondary battery) according to the present invention.

A secondary battery according to the invention includes a negative electrode formed by using an electrode structure having the above-described features, an electrolyte and a positive electrode, and utilizes the oxidation reaction of lithium and the reduction reaction of lithium ions. FIG. 6 is a schematic cross-sectional view of an embodiment of lithium secondary battery according to the present invention, illustrating the basic configuration thereof. Referring to FIG. 6, the secondary battery includes a negative electrode 601 formed by using an electrode structure according to the present invention, an ion conductor 602, a positive electrode 603, a negative electrode terminal 604, a positive electrode terminal 605, and a battery jar (housing) 606.

To prepare the secondary battery, an electrode group is formed as a stacked-layer structure by sandwiching the ion conductor between the negative electrode and the positive electrode, and then te electrode group is inserted into the battery jar under dry air or under a dry inert gas atmosphere where the dew point temperature is carefully controlled. Subsequently, the electrodes and the electrode terminals are connected and the battery jar is hermetically sealed to complete the operation of assembling the battery. When a porous polymer film holding the electrolyte solution is used as the ion conductor, the electrode group is formed by sandwiching the porous polymer film between the negative electrode and the positive electrode as a separator for preventing short-circuiting and then inserted into the battery jar. Subsequently, the electrodes and the electrode terminals are connected, and the electrolyte solution is injected before the battery jar is hermetically sealed to complete the operation of assembling the battery.

A lithium secondary battery including a negative electrode formed by using an electrode structure of an electrode material according to the present invention shows a high capacity and a high energy density and has a satisfactory cycle life because of the above-described remarkable advantages of the negative electrode.

(Positive Electrode 602)

The positive electrode 602 of the lithium secondary battery including the negative electrode of the electrode structure according to the present invention that is arranged opposite to the negative electrode is made of an positive electrode material that operates at least as lithium ion source and is a host material of lithium ions. Preferably, the positive electrode 602 is composed of a layer formed by using an positive electrode material that is a host material of lithium ions and a current collector. Additionally, the layer formed by using a positive electrode material includes the positive electrode material that is a host material of lithium ions and a binder, to which an auxiliary conductive material is added in certain cases.

Preferable positive electrode materials that function as lithium ion sources and are host materials for a lithium secondary battery according to the invention include lithium-transition metal oxides, lithium-transition metal sulfides, lithium-transition metal nitrides and lithium-transition metal phosphorylated compounds. Transition metals of such transition metal oxides, transition metal sulfides, transition metal nitride and transition metal phosphorylated compounds include metal elements typically having a d shell or an f shell. Examples of such transition metal elements include Sc, Y, lanthanoid, actinoid, Ti, Zr, Hf, V, Nb, Ta, Cr, Mo, W, Mn, Tc, Re, Fe, Ru, Os, Co, Rh, Ir, Ni, Pb, Pt, Cu, Ag and Au, and particularly Co, Ni, Mn, Fe, Cr and Ti are preferable.

Use of lithium-transition metal oxides, lithium-transition metal sulfides, lithium-transition metal nitrides and lithium-transition metal phosphorylated compounds makes it possible to exploit the performance of the negative electrode of an electrode structure according to the present invention and design the battery voltage and the storage capacity so as to obtain a high energy density lithium secondary battery, by mixing a plurality of positive electrode materials obtained by appropriately selecting transition metal elements contained in the above listed compounds.

When the positive electrode active materials are in a powdery form, a layer of the positive electrode active materials is formed on the current collector by using a binder or sintering or evaporating the materials to prepare the positive electrode. If the powder of the positive electrode active materials is poorly conductive, it will be necessary to mix an auxiliary conductive material as in the case of forming the active material layer of the electrode structure. Preferably, the powder of the positive electrode active materials are coated with a material selected from pitch, pitch coke, petroleum coke, coal tar, fluoranthene, pyrene, chrysene, phenanthrene, anthracene, naphthalin, flurorene, biphenyl and acenaphthene and subsequently carbonized under an inert gas atmosphere so that the powder is coated with a carbonized layer. Of the above listed materials to be carbonized, pitch, pitch coke, petroleum coke and coal tar provide an advantage of easiness of coating particles of the positive electrode materials because they show a low melting point. Additionally, they also provide an advantage of a low carbonization temperature that facilitates the operation of coating with a carbonized layer without reducing the performance of the positive electrode materials. The contact resistance between the particles of the positive electrode materials can be reduced. Still additionally, they are inexpensive. The ratio of the carbonized coat layer is preferably within a range from 1 to 5 wt % from the viewpoint of not sacrificing the lithium occlusion capacity of the positive electrode active materials and assisting the inter-particle electron conduction. Materials that can be used for the auxiliary conductive material and the binder include fluorine resins such as polyvinylidene fluoride, polyolefin resins such as polyethylene, rubber type resins such as styrene-butadiene rubber, polyimideamides, polyimides, polyimide precursors (before polyimides formation, or imperfectly formed polyimides), and denatured polyvinyl alcohol-based resins with reduced water-absorbing property.

Since above-described binder is electrically highly insulating and hence it is preferable to mix a conductive polymer material with the binder in order to raise the electro-conductivity of the positive electrode. Then, it is possible to achieve a highly uniform composite material formation because a conductive polymer has a strong affinity for organic polymer. The conductive polymer is added to the organic polymer of the binder preferably at an amount of 1 to 20, more preferably 2 to 10, based on 100 of the binder by weight from the viewpoint of maintaining the binding force and reducing the electric resistance. Conductive polymers that can be used for the purpose of the present invention include polymers of thiophene derivative monomers, pyrrole derivative monomers, aniline derivative monomers, acetylene derivative monomers and phenylene derivative monomers.

Materials that can be used for the current collector of the positive electrode include aluminum, titanium, nickel and platinum that show a high electric conductivity and are inactive relative to battery reactions. More specifically, nickel, stainless, titanium and aluminum are preferable. Above all, aluminum is highly preferable because it is inexpensive and shows a high electric conductivity. Although the current collector has a "plate shape", the thickness of the plate shape of the current collector is not particularly limited so long as it is good for practical applications. In other words, the current collector may be formed in the form of "foil" having a thickness of about 5 μm to 100 μm. Additionally, the plate may include a mesh-like plate, a sponge-like plate, a fiber-like plate, a punched metal plate and an expanded metal plate so long as it has a "plate shape".

(Ion conductor 603)

Conductors of lithium ions that can be used for the ion conductor of a lithium secondary battery according to present invention include a separator holding an electrolyte solutions (prepared by dissolving an electrolyte in a solvent), a solid electrolyte, a solidified electrolyte obtained by forming gel of an electrolyte solution by a polymeric gel or the like, and a composite of a polymeric gel and a solid electrolyte.

The electric conductivity of the ion conductor to be used for a secondary battery according to the present invention is preferably $1 \times 10^{-3}$ S/cm or more, more preferably $5 \times 10^{-3}$ S/cm or more, at 25° C.

Electrolytes that can be used for the ion conductor include salts of lithium ion ($Li^+$) and Lewis acid ions ($BF_4^-$, $PF_6^-$, $AsF_6^-$, $ClO_4^-$, $CF_3SO_3^-$ and $BPh_4^-$ (Ph: phenyl group)) and mixed salts thereof. It is desirable that the salt to be used for the ion conductor is sufficiently dehydrated and deoxygenated by heating under reduced pressure. Additionally, electrolytes prepared by dissolving lithium salt in fused salt may also be used for the purpose of the present invention.

Solvents that can be used for dissolving the electrolyte of the ion conductor include acetonitrile, benzonitrile, propylene carbonate, ethylene carbonate, dimethyl carbonate, diethyl carbonate, ethylmethyl carbonate, dimethylformamide, tetrahydrofuran, nitrobenzene, dichloroethane, diethoxyethane, 1,2-dimethoxyethane, chlorobenzene, γ-butyrolactone, dioxolane, sulfolane, nitromethane, dimethyl sulfide, dimethyl suloxide, methyl formate, 3-methyl-2-oxazolidinone, 2-methyltetrahydrofurane, 3-propylsydonone, sulfur dioxide, phosphoryl chloride, thionyl chloride, sulfuryl chloride and mixed solutions thereof.

The above solvents are preferably dehydrated by active alumina, a molecular sieve, phosphorus pentoxide or calcium chloride. Depending on the type of solvent to be used, the solvent may be distilled in the presence of alkali metal in inert gas to remove impurities and dehydrate the solvent. The electrolyte concentration of the electrolyte solution prepared by dissolving the electrolyte into the solvent is preferably within a range from 0.5 to 2.0 mol/liter for the purpose of realizing a high ionic conductivity.

Preferably, vinyl monomer that is apt to give rise to an electrolytic polymeric reaction may be added to the electrolyte solution for the purpose of suppressing the reaction between the electrode and the electrolyte solution. As vinyl monomers is added to the electrolyte solution, polymer coat film is formed on the surfaces of silicon alloy particles of the main active material by the charging reaction of the battery to suppress the reaction between the lithium that is occluded by silicon alloy particles or deposited on the surfaces of silicon alloy particles and the organic solvent of the electrolyte solution at the time of charging operation and consequently prolong the cycle life of the battery. When the vinyl monomer is only slightly added to the electrolyte solution, the above-described effect does not arise. When the vinyl monomer is added to the electrolyte solution is too much, the ionic conductivity of the electrolyte solution is reduced and the polymer coat film formed at the time of charging operation becomes large to increase the resistance of the electrode. Therefore, the vinyl monomer added to the electrolyte solution is preferably within a range from 1 to 5 wt %.

Specific examples of vinyl monomers that can be used for the purpose of the present invention include styrene, 2-vinylnaphthalene, 2-vinylpyridine, N-vinyl-2-pyrrolidone, divinyl ether, ethyl vinyl ether, vinylphenylether, methyl methacrylate, methyl acrylate, acrylonitrile and vinyl carbonate, and particularly, 2-vinylnaphthalene, 2-vinylpyridine, N-vinyl-2-pyrrolidone, divinyl ether, ethyl vinyl ether, vinylphenylether and vinyl carbonate are more preferable. Vinyl monomers having one or more aromatic groups are preferable because such monomers show a strong affinity for lithium ions. The use of combination of N-vinyl-2-pyrrolidone, divinyl ether, ethyl vinyl ether, vinylphenylether or vinyl carbonate that shows a strong affinity to solvents of the electrolyte solution with a vinyl monomer having one or more aromatic groups is more preferable for the purpose of the present invention.

From the viewpoint of preventing electrolyte solution from leaking, the use of solid electrolyte or solidified electrolyte is preferable. Examples of solid electrolyte include glass containing oxides formed from lithium, silicon, oxygen and phosphor or sulfur, and polymer complexes of organic polymers having an ether structure. Preferable examples of solidified electrolyte include those obtained by forming gel of the electrolyte solution by a gelling agent. Preferable gel forming agents that can be used for the purpose of the present invention include polymers that swell by absorbing the solvent of the electrolyte solution and porous materials that absorb a large amount of liquid such as silica gel. Examples of such polymers include polyethylene oxide, polyvinyl alcohol, polyacrylonitrile, polymethylmethacrylate, and vinylidene-fluoride-hexafluropropylene copolymer. Such polymers preferably have a cross-linked structure.

When a separator is used, it takes a role of preventing short-circuiting from taking place between the negative electrode 601 and the positive electrode 602 in the secondary battery. It may also take the role of holding the electrolyte solution. The separator is required to have a large number of pores that allow lithium ions to move therethrough and to be insoluble to the electrolyte solution and stable. Examples of materials that can be used for the separator include micropore structures and unwoven cloth such as glass, polyolefins including polypropylene and polyethylene, and fluorine resin. Additionally, metal oxide films having micro-pores and composites of resin films and such metal oxides can also be used for the purpose of the present invention.

[Profile and Structure of Battery]

As for the shape of a secondary battery according to the present invention, the battery has a flat, cylindrical, cubic or sheet shape. As for the structure of a secondary battery according to the present invention, the battery may be of a single layer type, a multilayer type or a spiral type. Particularly, spiral type cylindrical batteries provide an advantageous feature of having a large electrode area because a separator can be sandwiched between the negative electrode and the positive electrode and wound and hence being able to flow a large electric current at the time of charging/discharging operations. Cubic or sheet-shaped batteries, on the other hand, provide an advantageous feature of being adapted to be effectively stored in a narrow space of appliance when the number of batteries to be stored is large.

Figure 7:
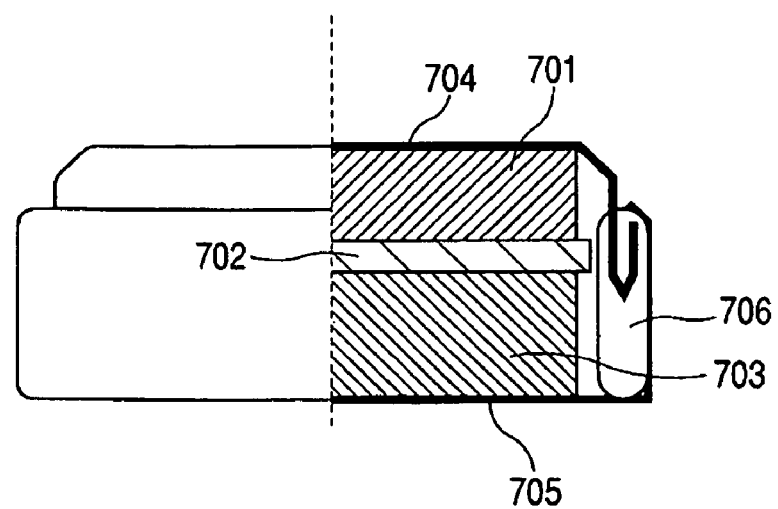
FIG. 7 is a schematic cross-sectional view of a single layered flat type (coin type) battery.

Now, a secondary battery according to the present invention will be described in detail in terms of shape and structure by referring to FIGS. 7 and 8. FIG. 7 is a schematic cross-sectional view of a single layered-flat type (coin type) battery and FIG. 8 is a schematic cross-sectional view of a spiral type cylindrical battery. The lithium secondary batterieshown in FIG. 7 or FIG. 8 are basically the same as the battery of FIG. 6 in terms of configuration and include a negative electrode, a positive electrode, an ion conductor, a battery housing, and output terminals.

In FIGS. 7 and 8, there are shown negative electrodes 701 and 803, positive electrodes 703 and 806, negative electrode terminals (negative electrode cap and negative electrode tin) 704 and 808, positive electrode terminals (positive electrode tin and positive electrode cap) 705 and 809, ion conductors 702 and 807, gaskets 706 and 810, a negative electrode current collector 801, a positive electrode current collector 804, an insulating plate 811, a negative electrode lead 812, a positive electrode lead 813 and a safety valve 814.

In the case of the flat type (coin type) secondary batteries shown in FIG. 7, the positive electrode 703 that includes a positive electrode material layer and the negative electrode 701 that has a negative electrode material layer are stacked through at least an ion conductor 702 formed by using a separator holding electrolyte solution to form a staked body. The stacked body is contained in the positive electrode tin 705, which operates as positive electrode terminal, from the positive electrode side, and the negative electrode side is covered by the negative electrode cap 704 as negative electrode terminal. In the remaining part in the positive electrode tin, the gasket 706 is arranged.

In the case of the spiral type cylindrical secondary batteries shown in FIG. 8, the positive electrode 806 having an positive electrode (material) layer 805 formed on the positive electrode current collector 804 and the negative electrode 804 having an electrode layer 802 formed on the negative electrode current collector 801 are arranged opposite to each other through the ion conductor 807 formed by using a separator holding electrolyte solution so as to form a stacked body having a cylindrical structure formed by winding the positive electrode layer 806, the negative electrode layer 802 and the ion conductor 807 by a number of turns. Then, the stacked body of the cylindrical structure is contained in the negative electrode tin 808 that operates as negative electrode terminal. The positive electrode cap 809 is arranged at the open side of the negative electrode tin 808 to operate as positive electrode terminal. The gasket 810 is arranged in the remaining part of the negative electrode tin. The stacked body of the electrodes having the cylindrical structure is separated from the positive electrode cap by the insulating plate 811. The positive electrode 806 is connected to the positive electrode cap 809 by way of the positive electrode lead 813. The negative electrode 803 is connected to the negative electrode tin 808 by way of the negative electrode lead 812. The safety valve 814 is arranged at the side of the positive electrode cap to regulate the internal pressure in the inside of the battery. The negative electrode 803 is formed by using the above-described electrode structure according to the present invention.

Now, a method of assembling a battery as illustrated in FIG. 7 or FIG. 8 will be described below.

(1) The separator (702, 807) is arranged between the negative electrode (701, 803) and the molded positive electrode (703, 806) and put into the positive electrode tin (705) or the negative electrode tin (808).
(2) After injecting the electrolyte solution, the negative electrode cap (704) or the positive electrode cap (809) and the gasket (706, 810) are assembled.
(3) The assembly of the above (2) is caulked to complete the operation of assembling the battery.

The operation of preparing the materials of the lithium battery and the operation of assembling the battery are desirably conducted in dry air from which moisture is thoroughly eliminated or in dry inert gas.

Now, the members for forming a secondary battery according to the present invention and having the above-described configuration will be described below.

(Gasket)

Examples of materials that can be used for the gasket include fluorine resin, polyolefin resin, polyamide resin, polysulfone resin and various rubber materials. Techniques that can be used for sealing the battery include the use of a sealed glass tube, the use of an adhesive agent, the use of welding and the use of soldering in addition to "caulking" involving the use of a gasket as shown in FIGS. 7 and 8. Any of various organic resin materials and ceramic materials may be used for the insulating plate (811) of FIG. 8.

(Outer Tin)

The outer tin of the battery includes the positive electrode tin or the negative electrode tin (705, 808) of the battery and the negative electrode cap or the positive electrode cap (704, 809), respectively. The outer tin is preferably made of stainless steel. Other materials that can preferably be used for the outer tin include aluminum alloys, titanium-clad stainless materials, copper-clad stainless materials and nickel-plated steel plates.

Since the positive electrode tin (705) in FIG. 7 and the negative electrode tin (808) in FIG. 8 operate both as battery housing (case) and as terminal, the use of stainless steel is preferable for the tin. However, when the positive electrode tin or the negative electrode tin is not adapted to operate as terminal, a metal material such as zinc, a plastic material such as polypropylene or a composite material of metal or glass fiber and plastic may be used for the battery housing in place of stainless steel.

(Safety Valve)

A safety valve is provided in a lithium secondary battery according to the present invention as a safety measure when the internal pressure of the battery rises abnormally. Materials that can be used for the safety valve include rubber, a spring, a metal ball and a rupture foil.

(Link Material 903)

Also, the inventors of the present invention believed that the electrochemical reaction in the electrode layer at the time of charging/discharging operations becomes more uniform when the contact resistance between the metal particles and the carbon particles in the electrode layer is improved and tried to make the electrochemical reaction more uniform in charging/discharging operations by adding a material that functions as "link" and uniformizes the connection of metal powder and carbon particles such as graphite particles that are totally different from each other. Effective link materials that can be used for the purpose of the present invention include coal tar pitch, carbonaceous materials of coal tar pitch and nonionic fluorine type surfactants.

Coal tar pitch has affinity for both metal particles having a hydrophilic surface and carbon particles having a hydrophobic surface and hence electron conduction between metal particles and carbon particles can be improved by adding coal tar pitch to and mixing it with metal particles and carbon particles. Preferably, coal tar pitch is added at amount of 0.1 to 3 wt %. Since the mechanical strength of coal tar pitch per se is poor, the mechanical strength of the electrode layer is reduced when coal tar pitch is added to a large ratio.

Electron conduction between metal particles and carbon particles can also be improved by adding coal tar pitch to and mixing it with metal particles and carbon particles, subsequently heat-treating the mixture in a temperature range from 400° C. to 700° C. under an inert gas atmosphere to carbonize the coal tar pitch and produce amorphous carbon and binding the metal particles and the carbon particles by means of the amorphous carbon obtained by the carbonization.

The use of metal particles that are turned amorphous to a large extent is preferable for a lithium secondary battery according to the present invention because such metal particles can improve the cycle life of the battery. A heat-treatment temperature of amorphous metal particles that exceeds 700° C. is not preferable because crystallization of the metal particles is accelerated and metal oxide is liable to be formed due to the adsorbed oxygen and the adsorbed moisture.

The metal particles may be coated with coal tar pitch in advance before carbonizing the coal tar pitch.

Preferably, coal tar pitch to be carbonized is added at an amount of 1 to 10 wt. % as the link material 903 for binding the metal particles 901 selected from silicon, tin or an alloy thereof and carbon particles 902. If coal tar pitch is added at an amount more than the above-defined range, amorphous carbon is produced to a large extent at the time of carbonization. Then, when a negative electrode is formed by the material obtained by binding the metal particles and carbon particles by means of the amorphous carbon that is obtained by carbonizing coal tar pitch and a lithium secondary battery is formed by using such a negative electrode, the irreversible capacity of lithium rises to reduce the Coulombic efficiency in the initial charging/discharging cycles.

Preferably, coal tar pitch to be used as the link material shows a low softening point and a high carbonization yield. The softening point of coal tar pitch is preferably within a range from 110 to 500° C., more preferably within a range from 150 to 350° C. For the purpose of the present invention, fixed carbon in coal tar pitch is preferably 59 to 90 wt %, more preferably 65 to 90 wt %. The weight reduction of coal tar pitch at 1,000° C. is preferably 55% or less. For the purpose of the present invention, coal tar pitch preferably contains mesophase spherules at an amount of 2 to 80% at the time of heating the coal tar pitch.

The above-described nonionic fluorine type surfactant can improve the contact between the metal particles and the carbon particles, the bonds between the metal particles and the binder and the bonds between the carbon particles and the binder when it is added at the time of forming an electrode layer from the metal particles, the carbon particles and the binder because such a nonionic fluorine type surfactant has C-F bonds and ether bonds or ester bonds so that it can improve the wettability of both substances having a hydrophilic surface and substances having a hydrophobic surface. For the purpose of the present invention, the nonionic fluorine type surfactant is added to form an electrode layer at an amount of 0.01 to 0.5 wt %. Since such a surfactant does not contribute to the charging/discharging reaction of the battery, it can degrade the performance of the battery if it is added to a large extent.

Figure 9A:
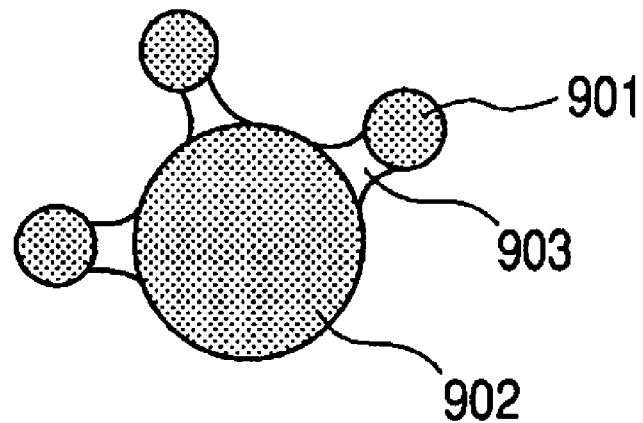
FIGS. 9A and 9B are schematic images of metal particles and a carbon particle connected to each other by a link material in an electrode structure according to the present invention.

FIG. 9A is a schematic image of metal particles 901 selected from silicon, tin or an alloy thereof and a carbon particle 902 connected to each other by a link material 903 in an electrode structure according to the present invention. Metal particles 901 and carbon particles 902 can be bound to each other with ease to facilitate electron conduction by using coal tar pitch or a fluorine type surfactant as the link material 903 that can easily be bonded to the surfaces of metal particles 901 having a hydrophilic surface and those of carbon particles 902 having a hydrophobic surface. Then, when it is used for the negative electrode material of a lithium secondary battery, it can raise the charging/discharging efficiency (Coulombic efficiency) and prolong the charging/discharging service life to effectively improve the performance of the metal material for occluding lithium to a large extent and realize a high capacity battery.

Figure 9B:
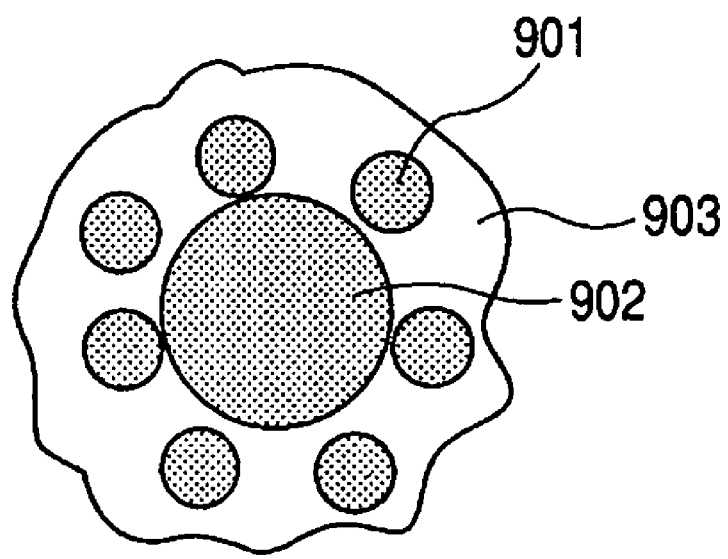

FIG. 9B is a schematic image of metal particles 901 and a carbon particles 902 that are integrally compounded by the link material 903. After mixing metal particles and carbon particles with a material that is apt to be carbonized such as coal tar pitch, the material that is apt to be carbonized is actually carbonized in inert gas such as nitrogen gas or argon gas to obtain metal particles and carbon particles that are integrally compounded by the carbonaceous material. Then, electron conduction between the metal particles and the carbon particles is facilitated by the carbonaceous material. Then, when it is used for the negative electrode material of a lithium secondary battery, it can raise the charging/discharging efficiency (Coulombic efficiency) and prolong the charging/discharging service lifetime to effectively improve the performance of the metal material for occluding lithium to a large extent and realize a high capacity battery.

Now, the present invention will be described in details with referring to the following Examples.

[Preparation of Electrode Material]

Firstly, a negative electrode material was prepared.

EXAMPLE 1

(1) Preparation of Main Active Material of Negative Electrode

Silicon, tin and copper were mixed at an atomic ratio of 82.9:16.6:0.5 (weight ratio of 65:30:5) and molten under an argon gas atmosphere to produce a melt. Subsequently, powder of an Si—Sn—Cu alloy was obtained by means of "Water atomization process" of injecting the melt by highly pressurized water. Then, the obtained powder of the Si—Sn—Cu alloy was crushed in isopropyl alcohol by means of a media mill using a zirconia ball to produce fine powder of the Si—Sn—Cu alloy showing an average particle size of 0.3 µm. Then, graphite powder was added to the obtained fine powder of the Si—Sn—Cu alloy at an amount of 15 wt % and the mixture was crushed in an Attriter mill under an argon gas atmosphere by means of a stainless steel ball for 10 hours to produce fine powder of the Si—Sn—Cu alloy that is compounded with carbon. The obtained Si—Sn—Cu alloy-carbon compounded powder was analyzed by means of an X-ray diffractometer to find that it was alloy powder of fine crystals of 30 nm that had been turned amorphous.

(2) Preparation of Negative Electrode

The Si—Sn—Cu alloy-carbon compounded powder obtained in the above (1) as the main active material, artificial graphite powder of pseudo-spherical particles with an average particle size of 27 µm, graphite powder with an average particle size of 5 µm as an auxiliary conductive material, and a solution of N-methyl-2-pyrrolidone as a polyamide precursor (polyamic acid) were mixed such that the weight ratio of the compounded powder, the artificial graphite powder, the graphite powder and the solid part of the solution was 74:10:5:11, and N-methyl-2-pyrrolidone was added as a solvent. The mixture was then kneaded to prepare slurry and the obtained slurry was applied to a copper foil having a ten point average height Rz=0.6 µm and a thickness of 15 µm by means of a coater. The applied slurry was then heat-treated at 150° C. for 30 minutes and subsequently at 220° C. for 1 hour and then dried at 200° C. under reduced pressure to prepare an electrode structure for negative electrode having a negative electrode layer with an average thickness of 20 µm and a density of 1.3 g/cm³.

The obtained electrode structure was cut to a predetermined size and a nickel ribbon lead was connected to the electrode by spot welding to produce a negative electrode.

(3) Preparation of Positive Electrode

Lithium-cobalt oxide LiCoO$_2$ was mixed with 5 wt % of graphite powder and 5 wt % of polyvinylidene fluoride powder and subsequently N-methyl-2-pyrrolidone was added to prepare slurry.

The obtained slurry of the positive electrode material was applied to a current collector of aluminum foil of a thickness of 20 µm and dried. Then, the current collector carrying the slurry was pressed by a roll press to make the positive electrode active material layer having a thickness of 90 μm and a density of 3.3 g/cm³ at one side of the foil. Then, an aluminum lead was connected to it by means of an ultrasonic welding machine and dried at 150° C. under reduced pressure to produce a positive electrode.

(4) Preparation Process of Electrolyte Solution

Moisture was thoroughly removed from ethylene carbonate and diethyl carbonate, and the two organic substances were mixed to a volume ratio of 3:7 to prepare a solvent.

1M (mol/liter) of lithium hexafluorophosphate ($LiPF_6$) was dissolved into the above solvent to prepare the electrolyte solution of the battery.

(5) Separator

A finely porous film of polyethylene with a thickness of 16 μm was used as separator.

(6) Assemblage of Battery

The battery was assembled entirely under a dry atmosphere where moisture was controlled to show a dew point of −50° C. or less.

The separator was sandwiched between the negative electrode and the positive electrode prepared in a manner as described above and the negative electrode/separator/positive electrode was put into a pocket-shaped battery jar prepared by using aluminum laminate film having a polyethylene/aluminum foil/nylon structure. Then, the electrolyte solution was poured into the battery jar and the electrode leads were taken out before the battery jar was heat-sealed to prepare a battery to be used for evaluating the control of the positive electrode capacity. The nylon film and the polyethylene film of the aluminum laminate film were made to face the outside and the inside, respectively.

EXAMPLE 2

A battery to be evaluated was prepared in the same manner as in Example 1 except that a copper foil having a ten point average height of Rz=2.1 μm and a thickness of 15 μm was used for the current collector of the negative electrode, and the prepared battery was evaluated.

EXAMPLE 3

The process as described below was used in place of the process of Example 1 to prepare a battery to be evaluated in an evaluation test.

(1) Preparation of Negative Electrode

A solution obtained by dispersing poly(2-ethylthiophene) at an amount of 10 wt % in a mixed solvent of ethylene carbonate and diethyl carbonate at a volume ratio of 3:7 and adding the obtained mixture to an N-methyl-2-pyrrolidone solution of a polyamide precursor (polyamic acid) such that poly(2-ethylthiophene) was 10 wt % of the solid part of the polyamide precursor (polyamic acid).

Then, the Si—Sn—Cu alloy-carbon compounded powder as the main active material, artificial graphite powder of pseudo-spherical particles with an average particle size of 22 μm, graphite powder with an average particle size of 5 μm as an auxiliary conductive material, and a solution of N-methyl-2-pyrrolidone as a polyamide precursor (polyamic acid) were mixed such that the weight ratio of the Si—Sn—Cu alloy-carbon compounded powder, the artificial graphite powder of pseudo-spherical particles with an average particle size of 22 μm, the graphite powder with an average particle size of 5 μm and the solid part of the solution of a polyamide precursor (polyamic acid) was 74:10:5:11. Then, N-methyl-2-pyrrolidone was added as a solvent and the mixture was kneaded to prepare slurry. The obtained slurry was applied to a copper foil having a ten points average height Rz=0.6 μm and a thickness of 15 μm by means of a coater. The applied slurry was then heat-treated at 150° C. for 30 minutes and subsequently at 220° C. for 1 hour and then dried at 200° C. under reduced pressure to prepare an electrode structure for negative electrode having a negative electrode layer with an average thickness of 20 μm and a density of 1.3 g/cm³.

The obtained electrode structure was cut to a predetermined size, and a nickel ribbon lead was connected to the electrode by spot welding to produce a negative electrode.

EXAMPLE 4

The process as described below was used in place of the process of Example 1 to prepare a battery to be evaluated in an evaluation test.

(1) Preparation of Negative Electrode

A buffer layer was formed on a copper foil by way of the following operation and subsequently a main active material layer was formed thereon.

Firstly, graphite powder with an average particle size of 5 μm and a solution of a polyamide precursor (polyamic acid) prepared similarly as in Example 3, to which poly(2-ethylthiophene) was added, were mixed such that the ratio of the graphite powder and the solid part of the solution was 93:7 by weight and then N-methyl-2-pyrrolidone was added as solvent. The mixture was kneaded to prepare slurry and the obtained slurry was applied to a copper foil having a ten point average height of Rz=0.6 μm and a thickness of 15 μm by means of a coater. The applied slurry was then dried at 150° C. to produce a buffer layer with a thickness of 5 μm and a density of 1.2 g/cm³. Poly(2-ethylthiophene) was added to the polyamide precursor (polyamic acid) functioning as a binder in order to provide the binder with electron conductivity. This is because the particles of graphite powder were so small that it was not possible to reduce the amount of the binding material to be used and the particles have a low electron conductivity, and hence the charging-discharging efficiency fell in a charging/discharging test at a high electric current density if compared with a charging/discharging test with a low electric current density because of the.

Then, Si—Sn—Cu alloy-carbon compounded powder as the main active material, artificial graphite powder of pseudo-spherical particles with an average particle size of 22 μm, graphite powder with an average particle size of 5 μm as an auxiliary conductive material, and a solution of N-methyl-2-pyrrolidone as a polyamide precursor (polyamic acid) were mixed such that the weight ratio of the compounded powder, the artificial graphite powder, the graphite powder and the solid part of the solution was 74:10:5:11, and N-methyl-2-pyrrolidone was added as a solvent. The mixture was then kneaded to prepare slurry and the obtained slurry was applied to a copper foil on which the buffer layer had been formed, by means of a coater. The applied slurry was then heat-treated at 150° C. for 30 minutes and subsequently at 220° C. for 1 hour and then dried at 200° C. under a reduced pressure to prepare an electrode structure for negative electrode having a negative electrode layer with a thickness of 20 μm and a density of 1.3 g/cm³.

The obtained electrode structure was cut to a predetermined size and a nickel ribbon lead was connected to the electrode by spot welding to produce a negative electrode.

EXAMPLE 5

The process as described below was used in place of the process of Example 1 to prepare a battery to be evaluated in an evaluation test.

(1) Preparation of Negative Electrode

A coat layer was formed by way of the following operation on an electrode structure prepared by the process of Example 1.

Firstly, graphite powder with an average particle size of 5 µm and a solution of a polyamide precursor (polyamic acid) prepared similarly as in Example 3, to which poly(2-ethylthiophene) was added, were mixed such that the ratio of the graphite powder and the solid part of the solution was 93:7 by weight, and then N-methyl-2-pyrrolidone was added as solvent. The mixture was kneaded to prepare slurry.

The obtained slurry was applied to an electrode structure prepared by the process of Example 2 by means of a coater. The applied slurry was then heat-treated at 150° C. for 30 minutes and subsequently at 220° C. for 1 hour and then dried at 200° C. under a reduced pressure to form a coat layer according to the present invention with a thickness of 5 µm and a density of 1.0 g/cm$^3$.

The obtained electrode structure was cut to a predetermined size and a nickel ribbon lead was connected to the electrode by spot welding to produce a negative electrode.

EXAMPLE 6

A buffer layer of a negative electrode was formed by carrying out the following operation, in place of the operation (1) in Example 4. Firstly, graphite powder with an average particle size of 5 µm, tungstic oxide $WO_3$ powder with an average particle size of 5 µm and a solution of a polyamide precursor (polyamic acid) prepared similarly as in Example 3, to which poly(2-ethylthiophene) was added, were mixed such that the weight ratio of the graphite powder, the $WO_3$ powder and the solid part of the solution was 50:43:7, and then N-methyl-2-pyrrolidone was added as a solvent. The mixture was kneaded to prepare slurry and the obtained slurry was applied to a copper foil having a ten point average height of Rz=0.6 µm and a thickness of 15 µm by means of a coater. The applied slurry was then dried at 150° C. to produce a buffer layer with a thickness of 5 µm and a density of 1.3 g/cm$^3$.

Subsequently, the other operations for preparing the battery were carried out similarly to the process of Example 4 to prepare a battery to be evaluated in an evaluation test.

EXAMPLE 7

A main active material layer was formed on a buffer layer similarly as in Example 6 and heat-treated at 150° C. for 30 minutes, but, before further heat-treating the buffer layer at 220° C. for 1 hour, a surface coat layer was formed by way of the following operation. Graphite powder with an average particle size of 5 µm functioning as auxiliary conductive material, lithium-titanium oxide $Li_{4/3}Ti_{5/3}O_2$ powder with an average particle size of 4 µm prepared by using titanium oxide and lithium carbonate as raw materials and a solution of a polyamide precursor (polyamic acid) prepared similarly as in Example 3, to which poly(2-ethylthiophene) was added, were mixed such that the weight ratio of the graphite powder, the $Li_{4/3}Ti_{5/3}O_2$ powder and the solid part of the solution was 60:33:7, and then N-methyl-2-pyrrolidone was added as a solvent. The mixture was kneaded to prepare slurry and the obtained slurry was applied to an electrode structure prepared by the process of Example 2 by means of a coater. The applied slurry was then heat-treated at 150° C. for 30 minutes and subsequently at 220° C. for 1 hour and then dried at 200° C. under a reduced pressure to form a coat layer according to the present invention with a thickness of 5 µm and a density of 1.1 g/cm$^3$. Thus, a three-layered electrode structure for a negative electrode was prepared.

Subsequently, the other operations for the battery were carried out similar to the process of Example 6 to prepare a battery to be evaluated in an evaluation test.

EXAMPLE 8

Electrolyte solution was prepared by adding 2 parts of styrene and 2 parts of vinylene carbonate to 100 parts of ethylene carbonate/diethyl carbonate solution of 1M(mol/liter) lithium hexafluorophosphate ($LiPF_6$) by weight, and the same process of Example 1 was used to prepare a battery to be evaluated in an evaluation test.

EXAMPLE 9

The same process as of Example 2 was used to prepare a battery to be evaluated in an evaluation test except that the binder obtained by adding a conductive polymer to the binder of Example 3 and the electrolyte solution obtained by adding styrene and vinylene carbonate to the electrolyte solution of Example 8 were used.

EXAMPLE 10

(1) Preparation of Main Active Material of Negative Electrode

Si—Sn—Cu alloy-carbon compounded powder (melting point: 150° C., carbonized at 700° C.) which was the same as the powder obtained in the operation (1) of preparation of the main active material of Example 1 was coated with coal tar pitch and then held under a nitrogen atmosphere at 600° C. for 1 hour. Subsequently, it was heat-treated at 700° C. for 1 hour to carbonize the coal tar pitch and prepare carbon-coated (5 wt %) Si—Sn—Cu alloy-carbon compounded powder.

(2) Preparation of Negative Electrode

The process (2) in Example 1 was used to prepare a negative electrode by using the carbon-coated Si—Sn—Cu alloy-carbon compounded powder, which was the main active material, obtained in the above process (1), in place of the Si—Sn—Cu alloy-carbon compounded powder of (2) in Example 1.

Subsequently, the process of Example 1 was used to prepare a battery to be evaluated in an evaluation test.

EXAMPLE 11

The process of Example 3 was used to prepare a battery to be evaluated, except that the copper foil of the current collector was replaced by a copper coil having a ten point average height of Rz=2.1 µm and a thickness of 15 µm, and the electrolyte solution obtained by adding styrene and vinylene carbonate to the electrolyte solution of Example 8 was used.

REFERENCE EXAMPLE 1

An electrode structure to be used for a negative electrode was prepared by the same process as in Example 1 except that graphite powder of flat particles (substantially disk-shaped graphite particles with a diameter of about 5 µm and a thickness of about 1 μm) was used in place of the artificial graphite powder of pseudo-spherical particles with an average particle size of 22 μm. Otherwise, the process of Example 1 was used to prepare a battery to be evaluated.

COMPARATIVE EXAMPLE 1

An electrode structure to be used for a negative electrode was prepared using a process as described below.

As main active material, artificial graphite powder of pseudo-spherical particles with an average particle size of 22 μm, and a solution of N-methyl-2-pyrrolidone as a polyamide precursor (polyamic acid) were mixed such that the weight ratio of the powder and the solid part of the solution was 89:11. Then, N-methyl-2-pyrrolidone was added as a solvent, and the mixture was kneaded to prepare a slurry. The obtained slurry was applied to a copper foil having a ten point average height of Rz=0.6 μm and a thickness of 15 μm by means of a coater. The applied slurry was then heat-treated at 150° C. for 30 minutes and subsequently at 220° C. for 1 hour and then dried at 200° C. under a reduced pressure to prepare an electrode structure for a negative electrode having a negative electrode layer with a thickness of 20 μm and a density of 1.4 g/cm$^3$.

The obtained electrode structure was cut to a predetermined size and a nickel ribbon lead was connected to the electrode by spot welding to produce a negative electrode.

The same process as in Example 1 was used to prepare a battery to be evaluated in an evaluation test except for the preparation of the negative electrode.

[Evaluation of Batteries]

A charging/discharging test was conducted on each battery by repeating a cycle of constant current-constant voltage charging: charging to 4.2V by a constant current at a rate of 1 C and, when the battery voltage reached to 4.2V, shifting to constant voltage charging of 4.2V, and discharging by a constant current at rate of 1 C down to a battery voltage of 3.0V, referring to the capacity of the positive electrode, for 100 times. A pause of 30 minutes was provided when switching from charging to discharging and when switching from discharging to charging. The first discharged capacity, the ratio of the first discharged capacity to the first charged capacity (charging-discharging efficiency=Coulombic efficiency), the 100th discharged capacity and the ratio of the 100th discharged capacity to the 100th charged capacity were observed to evaluate the battery by comparing the above values with the corresponding values of Reference Example 1, normalizing each of the values of Reference Example 1 to 1.00. Table 1 summarily shows the obtained results.

The capacity to be charged of the battery to be evaluated of Comparative Example 1 was limited so as not to exceed the capacity of the negative electrode that was computationally determined in advance because the storage capacity of the negative electrode of Comparative Example 1 was low.

TABLE 1

| | Normalized values based on values of Reference Example 1 being normalized to 1.00 | | | |
|---|---|---|---|---|
| Example | 1st discharging quantity | 1st charging-discharging efficiency | 100th charged quantity | 100th charging-discharging efficiency |
| Example 1 | 1.00 | 1.25 | 1.52 | 1.03 |
| Example 2 | 1.00 | 1.25 | 2.54 | 1.03 |
| Example 3 | 1.00 | 1.23 | 2.51 | 1.04 |

TABLE 1-continued

| | Normalized values based on values of Reference Example 1 being normalized to 1.00 | | | |
|---|---|---|---|---|
| Example | 1st discharging quantity | 1st charging-discharging efficiency | 100th charged quantity | 100th charging-discharging efficiency |
| Example 4 | 1.00 | 1.21 | 1.87 | 1.03 |
| Example 5 | 1.00 | 1.17 | 1.75 | 1.02 |
| Example 6 | 1.00 | 1.19 | 1.95 | 1.03 |
| Example 7 | 0.98 | 1.15 | 2.06 | 1.02 |
| Example 8 | 1.00 | 1.07 | 2.48 | 1.03 |
| Example 9 | 1.00 | 1.20 | 3.05 | 1.04 |
| Example 10 | 0.95 | 1.15 | 1.98 | 1.03 |
| Example 11 | 1.00 | 1.25 | 3.24 | 1.04 |
| Ref. Ex. 1 | 1.00 | 1.00 | 1.00 | 1.00 |
| Com. Ex. 1 | 0.24 | 1.26 | 1.02 | 1.04 |

The discharged capacity per unit weight of the electrode layer (except for the weight of the current collector) maximally showed a value of 1,300 mAh/g or more in Example 1.

From Table 1, it is clear that all the batteries of Examples 1 through 11 operated better than the battery of Reference Example 1 in terms of the first discharged capacity, the ratio of the first discharged capacity to the first charged capacity, the 100th discharged capacity, and the ratio of the 100th discharged capacity to the 100th charged capacity.

By comparing with the battery of Comparative Example 1 where graphite was used for the negative electrode, it is also clear that the batteries of Examples 1 through 11 operated better than the battery of Comparative Example 1 in terms of the first discharged capacity and the 100th discharged capacity, although the battery of Comparative Example 1 excelled the batteries of Examples 1 to 11 in terms of the ratio of the first discharged capacity to the first charged capacity.

Additionally, batteries to be evaluated in an evaluation test were prepared by using different materials for the positive electrode in order to raise the battery voltage at the time of discharging and improve the safety.

EXAMPLE 12

A battery to be evaluated was prepared similarly as in Example 11 except that a positive electrode prepared by a process as described below was used.

(3) Preparation of Positive Electrode 35 wt % of spinel type lithium manganese oxide $LiMn_{1.5}Ni_{0.5}O_4$ and 55 wt % of zirconium-added lithium cobalt oxide $LiCo_{0.96}Zr_{0.04}O_2$ were mixed with 5 wt % of graphite powder and 5 wt % of powdery polyvinylidene fluoride, and N-methyl-2-pyrrolidone was added to the mixture to prepare a slurry.

The obtained positive electrode material slurry was applied to a current collector of aluminum foil with a thickness of 20 μm and dried. Subsequently, the slurry on the current collector was pressed by a roll press to make the positive electrode active material layer having a thickness of 90 μm and a density of 3.3 g/cm$^3$ on one side of the foil. Then, an aluminum lead was connected to it by means of an ultrasonic welding machine and dried at 150° C. under reduced pressure to produce a positive electrode.

EXAMPLE 13

A battery to be evaluated was prepared similarly as in Example 11 except that a positive electrode prepared by a process as described below was used.

(1) Preparation of Positive Electrode 45 wt % of $LiCo_{0.33}Ni_{0.34}Mn_{0.33}O_2$ and 45 wt % of zirconium-added lithium cobalt oxide $LiCo_{0.96}Zr_{0.04}O_2$ were mixed with 5 wt % of graphite powder and 5 wt % of powdery polyvinylidene fluoride, and then N-methyl-2-pyrrolidone was added to the mixture to prepare a slurry.

The obtained positive electrode material slurry was applied to a current collector of aluminum foil with a thickness of 20 μm and dried. Subsequently, the slurry on the current collector was pressed by a roll press to make the positive electrode active material layer having a thickness of 90 μm and a density of 3.3 g/cm³ on one side of the foil. Then, an aluminum lead was connected to it by means of an ultrasonic welding machine and dried at 150° C. under reduced pressure to produce a positive electrode.

EXAMPLE 14

A battery to be evaluated was prepared similarly as in Example 11 except that a positive electrode prepared by a process as described below was used.

(1) Preparation of Positive Electrode 40 wt % of spinel type lithium manganese oxide $LiMn_{1.5}Ni0.5O_4$ and 50 wt % of $LiNi_{0.34}Co_{0.33}Mn_{0.33}O_2$ were mixed with 5 wt % of graphite powder and 5 wt % of powdery polyvinylidene fluoride, and then N-methyl-2-pyrrolidone was added to the mixture to prepare a slurry.

The obtained positive electrode material slurry was applied to a current collector of aluminum foil with a thickness of 20 μm and dried. Subsequently, the slurry on the current collector was pressed by a roll press to make the positive electrode active material layer having a thickness of 90 μm and a density of 3.3 g/cm³ at a side of the foil. Then, an aluminum lead was connected to it by means of an ultrasonic welding machine and dried at 150° C. under a reduced pressure to produce a positive electrode.

EXAMPLE 15

A battery to be evaluated was prepared similarly as in Example 11 except that a positive electrode prepared in a process as described below was used.

(1) Preparation of Positive Electrode 30 wt % of spinel type lithium manganese oxide $LiMn_{1.5}Ni_{0.5}O_4$, 10 wt % of $LiMn_2O_4$ and 50 wt % of $LiNi_{0.34}Co_{0.33}Mn_{0.33}O_2$ were mixed with 5 wt % of graphite powder and 5 wt % of powdery polyvinylidene fluoride, and then N-methyl-2-pyrrolidone was added to the mixture to prepare a slurry.

The obtained positive electrode material slurry was applied to a current collector of aluminum foil with a thickness of 20 μm and dried. Subsequently, the slurry on the current collector was pressed by a roll press to make the positive electrode active material layer having a thickness of 90 μm and a density of 3.3 g/cm³ on one side of the foil. Then, an aluminum lead was connected to it by means of an ultrasonic welding machine and dried at 150° C. under a reduced pressure to produce a positive electrode.

[Evaluation of Batteries]

The discharging capacity and the average discharging voltage of each of the batteries obtained in Examples 12 through 15 were evaluated by comparing them with the batteries obtained in Example 11 and Comparative Example 1 by way of the process as described below.

A charging/discharging test was conducted on each battery by repeating a cycle of constant current-constant voltage charging: charging to 4.6V by a constant current at a rate of 1 C and, when the battery voltage reached to 4.6V, shifting to constant voltage charging of 4.6V, and discharging by a constant current at rate of 0.2 C down to a battery voltage of 2.75V, referring to the capacity of the positive electrode of Example 11. A pause of 30 minutes was provided when switching from charging to discharging and when switching from discharging to charging. The fifth discharged capacity was observed and the 5th average discharge voltage was determined for each battery to evaluate the battery by comparing the above values with the corresponding values of Reference Example 11, normalizing each of the values of Example 11 to 1.00. Table 2 summarily shows the obtained results.

TABLE 2

| | Normalized values based on values of Reference Example 11 being normalized to 1.00 | |
| --- | --- | --- |
| Example | 5th discharged quantity | 5th average discharge voltage |
| Example 12 | 1.07 | 1.15 |
| Example 13 | 1.25 | 1.00 |
| Example 14 | 1.11 | 1.13 |
| Example 15 | 1.12 | 1.09 |
| Example 11 | 1.00 | 1.00 |
| Comp. Example 1 | 0.24 | 1.12 |

From the results summarized in Table 2, it was found that the discharge voltage is raised and the discharged capacity is increased by appropriately adding lithium-manganese-nickel oxide, lithium-cobalt-nickel-manganese oxide and/or lithium-cobalt oxide.

[Safety Evaluation Test]

The safety of each of the batteries of Examples 12 through 15 was evaluated by comparing it with the battery of Example 11 in the following manner. The battery was charged by a constant current at a rate of 1 C up to 5.0V, referring to the capacity of the positive electrode of the battery of Example 11. Then, each of the batteries was evaluated by means of accelerating rate calorimetry (ARC). As a result, it was found that the battery of Example 11 had the lowest heat-emission starting temperature, and that the heat-emitting rate at and near 100° C. was ranked by the order of Example 11, Example 13, Example 12, Example 14 and Example 15. Thus, it was found that the safety of battery is improved by the positive electrode containing one or more manganese compounds.

From Table 2 and the results of the safety evaluation test, it was found that a lithium secondary battery having a negative electrode formed by using a negative electrode material containing silicon, tin or an alloy thereof is made safe and to show a high energy density when combined with an appropriate positive electrode material.

EXAMPLE 16

A battery to be evaluated was prepared similarly as in Example 11 except that a positive electrode prepared by a process as described below was used.

(1) Preparation of Positive Electrode $LiCo_{0.33}Ni_{0.34}Mn_{0.33}O_2$ and zirconium-added lithium cobalt oxide $LiCo_{0.96}Zr_{0.04}O_2$ were mixed such that a weight ratio thereof was 50:50, and 10 parts of coal tar pitch (with a melting point of 350° C. to be carbonized at 700° C.) was added to 100 parts of the mixture. Then, the mixture was treated under an argon gas atmosphere at 400° C. for 1 hour and subsequently at 700° C. for 1 hour to obtain $LiCo_{0.33}Ni_{0.34}Mn_{0.33}O_2$ and $LiCo_{0.96}Zr_{0.04}O_2$ that were coated with carbonaceous material of coal tar pitch. The obtained product contained carbonaceous material of coal tar pitch by 2 wt %.

Thereafter, the obtained product of $LiCo_{0.33}Ni_{0.34}Mn_{0.33}O_2$ and $LiCo_{0.96}Zr_{0.04}O_2$ that were coated with carbonaceous material of coal tar pitch was mixed with 5 wt % of graphite powder and 5 wt % of powdery polyvinylidene fluoride, and then N-methyl-2-pyrrolidone was added to the mixture to prepare a slurry.

The obtained positive electrode material slurry was applied to a current collector of aluminum foil with a thickness of 20 µm and dried. Subsequently, the slurry on the current collector was pressed by a roll press to make the positive electrode active material layer having a thickness of 90 µm and a density of 3.3 g/cm³ on one side of the foil. Then, an aluminum lead was connected to it by means of an ultrasonic welding machine and dried at 150° C. under a reduced pressure to produce a positive electrode.

The high rate discharging performance of the battery obtained in Example 16 was evaluated by comparing it with the battery of Example 11 in the following manner.

A charging/discharging test was conducted on each battery by repeating a cycle of constant current-constant voltage charging: charging to 4.6V by a constant current at a rate of 1 C and, when the battery voltage reached to 4.6V, shifting to constant voltage charging of 4.6V, and discharging by a constant current at rate of 2.0 C down to a battery voltage of 2.75V, referring to the capacity of the positive electrode of Example 11. The fifth discharged capacity was observed to find that the discharged capacity of the battery of Example 16 was 1.2 times that of the battery of Example 11. From this point, it was found that the performance of a battery is improved in efficient discharging at an elevated current density by coating the particles of the positive electrode active material with the carbonized coal tar pitch.

REFERENCE EXAMPLE 2

(1) Preparation of Silicon Alloy to be Used for Main Material of Negative Electrode Layer As metal powder to be used for forming a negative electrode, fine powder of silicon was obtained by crushing metal silicon powder in isopropyl alcohol in a medial mill using zirconia beads such that the powder had an average particle size of 0.2 µm.

The fine powder of silicon was mixed with tin powder, copper powder, boron powder and graphite powder such that a weight ratio thereof was 58.5:27.0:4.5:1.0:9.0, and the mixture was crushed in an Attriter mill under an argon gas atmosphere by means of a stainless steel ball for 24 hours to produce fine powder of the Si—Sn—Cu—B alloy that was compounded with carbon as the electrode material.

(2) Preparation of Negative Electrode

The Si—Sn—Cu alloy-carbon compounded powder obtained in the above (1) as the main active material, artificial graphite powder of pseudo-spherical particles with an average particle size of 27 µm, graphite powder with an average particle size of 5 µm as an auxiliary conductive material, and a solution of N-methyl-2-pyrrolidone of polyamideimide were mixed such that the weight ratio of the compounded powder, the artificial graphite powder, the graphite powder and the solid part of the solution was 74:10:5:11, and N-methyl-2-pyrrolidone was added as a solvent. The mixture was then kneaded to prepare a slurry and the obtained slurry was applied to a copper foil having a ten point average height of Rz=0.6 µm and a thickness of 15 µm by means of a coater. The applied slurry was then heat-treated at 150° C. for 30 minutes and then dried at 200° C. under a reduced pressure to prepare an electrode structure for negative electrode having a negative electrode layer with an average thickness of 20 µm and a density of 1.3 g/cm³.

The obtained electrode structure was cut to a predetermined size and a nickel ribbon lead was connected to the electrode by spot welding to produce a negative electrode.

(3) Preparation of Positive Electrode

Lithium-cobalt oxide $LiCoO_2$ was mixed with 5 wt % of graphite powder and 5 wt % of polyvinylidene fluoride powder and subsequently N-methyl-2-pyrrolidone was added to the mixture to prepare a slurry.

The obtained slurry of the positive electrode material was applied to a current collector of aluminum foil of a thickness of 20 µm and dried. Then, the slurry on the current collector was pressed by a roll press to make the positive electrode active material layer having a thickness of 90 µm and a density of 3.3 g/cm³ on one side of the foil. Then, an aluminum lead was connected to it by means of an ultrasonic welding machine and dried at 150° C. under a reduced pressure to produce a positive electrode.

(4) Preparation Process of Electrolyte Solution

Moisture was thoroughly removed from ethylene carbonate and diethyl carbonate, and these solvents were mixed at a volume ratio of 3:7 to prepare a mixed solvent.

Lithium hexafluorophosphate ($LiPF_6$) was dissolved at 1M (mol/liter) into the above solvent to prepare the electrolyte solution of the battery.

(5) Separator

A finely porous film of polyethylene with a thickness of 16 µm was used as a separator.

(6) Assemblage of Battery

The battery was assembled entirely under a dry atmosphere where moisture was controlled so as to show a dew point of −50° C. or less.

The separator was sandwiched between the negative electrode and the positive electrode prepared in a manner as described above and the negative electrode/separator/positive electrode were put into a pocket-shaped battery jar prepared by using aluminum laminate film having a polyethylene/aluminum foil/nylon structure. Then, the electrolyte solution was poured into the battery jar and the electrode leads were taken out before the battery jar was heat-sealed to prepare a battery to be used for evaluating the control of the positive electrode capacity. The nylon film and the polyethylene film of the aluminum laminate film were arranged to face the outside and the inside, respectively.

EXAMPLE 17

(1) Preparation of Main Material of Negative Electrode Layer

Si—Sn—Cu alloy-carbon compounded powder obtained in the above (1) of Reference Example 1, artificial graphite powder of pseudo-spherical particles with an average particle size of 27 µm, graphite powder with an average particle size of 5 µm as an auxiliary conductive material, and coal tar pitch MCP-350 (tradename, available from JFE Chemical Corporation, softening temperature: 350° C., solid carbon: 88%, weight loss at 1,000° C.: 16%) were mixed such that a weight ratio thereof was 74:10:5:1, and isopropyl alcohol was added to the mixture. Then, the mixture was mixed further in a planetary ball mill, using an agate-made vessel and a ball, and the obtained mixture was dried at 80° C. to obtain alloy-graphite-coal tar pitch compounded powder.

(2) Preparation of Negative Electrode

The alloy-graphite-coal tar pitch compounded powder obtained in the above (1) and a solution of N-methyl-2-pyrrolidone of polyamideimide were mixed such that the weight ratio of the powder and the solid part of the solution was 89:11, and then N-methyl-2-pyrrolidone was added as a solvent. The mixture was then kneaded to prepare slurry and the obtained slurry was applied to a copper foil having a ten point average height of Rz=0.6 μm and a thickness of 15 μm by means of a coater. The applied slurry was then heat-treated at 150° C. for 30 minutes and then dried at 200° C. under a reduced pressure to prepare an electrode structure for a negative electrode having a negative electrode layer with an average thickness of 20 μm and a density of 1.3 g/cm$^3$.

The obtained electrode structure was cut to a predetermined size and a nickel ribbon lead was connected to the electrode by spot welding to produce a negative electrode.

Thereafter, the same process as in Reference Example 2 was used to prepare a battery to be evaluated.

EXAMPLE 18

(1) Preparation of Main Material of Negative Electrode Layer

Si—Sn—Cu alloy-carbon compounded powder obtained in the above (1) of Reference Example 2, artificial graphite powder of pseudo-spherical particles with an average particle size of 27 μm, graphite powder with an average particle size of 5 μm as an auxiliary conductive material, and coal tar pitch MCP-350 (tradename, available from JFE Chemical Corporation, softening temperature: 350° C., solid carbon: 88%, weight loss starting temperature: 420° C., weight loss at 1,000° C.: 16%) were mixed such that a weight ratio thereof was 74:10:5:10, and isopropyl alcohol was added to the mixture. Then, the mixture was mixed further in a planetary ball mill, using an agate-made vessel and a ball, and the obtained mixture was dried at 80° C. to obtain alloy-graphite-coal tar pitch compounded powder. The obtained compounded powder was heat-treated at 550° C. for 1 hour under an N$_2$ gas flow to carbonize the coal tar pitch into amorphous carbon and obtain alloy-carbonized coal tar pitch-graphite compounded powder.

(2) Preparation of Negative Electrode

The alloy-carbonized coal tar pitch-graphite compounded powder obtained in the above (1) and a solution of N-methyl-2-pyrrolidone that was a polyamideimide were mixed such that the weight ratio of the powder and the solid part of the solution was 89:11, and then N-methyl-2-pyrrolidone was added as a solvent. The mixture was then kneaded to prepare slurry and the obtained slurry was applied to a copper foil having a ten point average height of Rz=0.6 μm and a thickness of 15 μm by means of a coater. The applied slurry was then heat-treated at 150° C. for 30 minutes and then dried at 200° C. under a reduced pressure to prepare an electrode structure for negative electrode having a negative electrode layer with an average thickness of 20 μm and a density of 1.3 g/cm$^3$.

The obtained electrode structure was cut to a predetermined size and a nickel ribbon lead was connected to the electrode by spot welding to produce a negative electrode.

Thereafter, the same process as in Reference Example 2 was used to prepare a battery to be evaluated.

EXAMPLE 19

(1) Preparation of Main Material of Negative Electrode Layer

Si—Sn—Cu alloy-carbon compounded powder obtained in the above (1) of Reference Example 2, coal tar pitch MCP-350 (tradename, available from JFE Chemical Corporation, softening temperature: 350° C., solid carbon: 88%, weight loss starting temperature: 420° C., weight loss at 1,000° C.: 16%), and surfactant Novec FC-4430 (tradename, available from 3M) which is fluorine type aliphatic polymer ester were mixed such that a weight ratio thereof was 95:5:0.5, and acetone was added to the mixture. Then, the mixture was mixed further in a planetary ball mill, using an agate-made vessel and a ball, and the obtained mixture was dried at 50° C. to obtain coal-tar-pitch-coated alloy-carbon compounded powder. The obtained alloy powder was heat-treated at 700° C. for 1 hour under an argon gas flow to carbonize the coal tar pitch into amorphous carbon and obtain amorphous-carbon-coated alloy-carbon compounded powder.

(2) Preparation of Negative Electrode

The amorphous-carbon-coated alloy-carbon compounded powder obtained in the above (1), artificial graphite powder of pseudo-spherical particles with an average particle size of 27 μm, graphite powder with an average particle size of 5 μm as an auxiliary conductive material, and surfactant Novec FC-4430 (tradename, available from 3M) which is fluorine type aliphatic polymer ester were mixed such that a weight ratio thereof was 74:10:5:0.1. Then, a solution of N-methyl-2-pyrrolidone was added as a solvent, and the mixture was mixed further. Subsequently, the solid part of the solution of N-methyl-2-pyrrolidone of polyamideimide was added to the amorphous-carbon-coated alloy-carbon compounded powder such that the weight ratio of the solid part of the N-methyl-2-pyrrolidone solution and powder was 11:74. The mixture was then kneaded to prepare slurry and the obtained slurry was applied to a copper foil having a ten point average height of Rz=0.6 μm and a thickness of 15 μm by means of a coater. The applied slurry was then heat-treated at 150° C. for 30 minutes and then dried at 200° C. under a reduced pressure to prepare an electrode structure for a negative electrode having a negative electrode layer with an average thickness of 20 μm and a density of 1.3 g/cm$^3$.

The obtained electrode structure was cut to a predetermined size and a nickel ribbon lead was connected to the electrode by spot welding to produce a negative electrode.

Thereafter, the same process as in Reference Example 2 was used to prepare a battery to be evaluated.

EXAMPLE 20

The process (2) of preparing a negative electrode in Reference Example 2 was used in a manner as described below.

Si—Sn—Cu alloy-carbon compounded powder obtained in the above (1) of Reference Example 2, artificial graphite powder of pseudo-spherical particles with an average particle size of 27 μm, graphite powder with an average particle size of 5 μm as an auxiliary conductive material, and surfactant Novec FC-4430 (tradename, available from 3M) which is fluorine type aliphatic polymer ester were mixed such that a weight ratio thereof was 74:10:5:0.1. Then, a solution of N-methyl-2-pyrrolidone was added as a solvent, and the mixture was mixed further. Subsequently, the solid part of the solution of N-methyl-2-pyrrolidone of polyamideimide was added to the mixture such that the weight ratio of the solid part of the N-methyl-2-pyrrolidone solution to the Si—Sn—Cu alloy-carbon compounded powder was 11:74. The mixture was then kneaded to prepare a slurry and the obtained slurry was applied to a copper foil having a ten point average height of Rz=0.6 μm and a thickness of 15 μm by means of a coater. The applied slurry was then heat-treated at 150° C. for 30 minutes and then dried at 200° C. under a reduced pressure to prepare an electrode structure for a negative electrode having a negative electrode layer with an average thickness of 20 μm and a density of 1.3 g/cm$^3$.

The obtained electrode structure was cut to a predetermined size and a nickel ribbon lead was connected to the electrode by spot welding to produce a negative electrode.

Thereafter, the same process as in Reference Example 2 was used to prepare a battery to be evaluated.

[Evaluation of Batteries]

A charging/discharging test was conducted on each battery by repeating a cycle of constant current-constant voltage charging: charging to 4.2V by a constant current at a rate of 1 C and, when the battery voltage reached to 4.2V, shifting to constant voltage charging of 4.2V, and discharging by a constant current at rate of 1 C down to a battery voltage of 2.5V, referring to the capacity of the positive electrode, for 100 times. A pause of 30 minutes was provided when switching from charging to discharging and when switching from discharging to charging. The 100th discharged capacity relative to the 1st discharged quantity was evaluated as capacity maintaining ratio for each battery and the ratio was compared with the corresponding ratio of Reference Example 2, normalizing the value of Reference Example 2 to 1.0. Table 3 summarily shows the obtained results.

TABLE 3

| | Capacity maintaining ratio of 100th cycle (%)/capacity maintaining ratio of Reference Example 2 (%) |
|---|---|
| Reference Example 2 | 1.0 |
| Example 17 | 1.3 |
| Example 18 | 1.4 |
| Example 19 | 1.4 |
| Example 20 | 1.2 |

As described above, the present invention provides a lithium secondary battery having a large capacity, a high energy density and a long cycle life.

Thus, a lithium secondary battery can realize a high storage capacity and a high energy density as well as a long cycle life.

This application claims priority from Japanese Patent Application No. 2004-358458 filed on Dec. 10, 2004, which is hereby incorporated by reference herein.

What is claimed is:

1. An electrode structure for a lithium secondary battery, comprising:
   a main active material layer comprising: a metal powder of a material selected from the group consisting of silicon, tin and an alloy thereof that can store and discharge lithium by electrochemical reaction; hard carbon powder or carbon powder of graphite; and a binder of an organic polymer; and
   a current collector,
   wherein the metal powder and the carbon powder are compounded by a link material having a function of carrying out chemical bonding or electron conduction between the metal powder and the carbon powder, and
   wherein the link material is coal tar pitch, and fixed carbon in the coal tar pitch is 59 to 90 wt %.

2. The electrode structure according to claim 1, wherein the coal tar pitch contains mesophase spherules at an amount of 2 to 80% at the time of heating the coal tar pitch.

3. The electrode structure according to claim 2, wherein the coal tar pitch is contained at an amount of 0.1 to 3 wt % in the main active material layer.

4. A lithium secondary battery comprising a negative electrode formed by using an electrode structure according to claim 1, a lithium ion conductor, and a positive electrode, wherein an oxidation reaction of lithium and a reduction reaction of lithium ions are utilized.

5. A method of producing the electrode structure according to claim 2, comprising:
   a step of mixing the metal powder and the carbon powder with coal tar pitch at an amount of 0.1 to 3 wt %; and
   a step of adding the binder to a mixture obtained in the above step, mixing them, and applying the obtained mixture onto a plate-shaped metal current collector.

6. The method according to claim 5, wherein in the step of adding the binder to the mixture, mixing them and applying the obtained mixture onto the plate-shaped metal current collector, a solvent for the binder is added to and mixed with the mixture at the time of mixing the binder with the mixture.

7. A method of producing a lithium secondary battery, comprising a step of interposing a lithium ion conductor between a negative electrode formed by using an electrode structure produced by a method according to claim 5 and a positive electrode.

* * * * *